US008982291B2

(12) United States Patent
Takagi et al.

(10) Patent No.: US 8,982,291 B2
(45) Date of Patent: Mar. 17, 2015

(54) IMAGE DISPLAY DEVICE

(71) Applicants: Ayako Takagi, Kanagawa-ken (JP); Shinichi Uehara, Tokyo (JP); Masako Kashiwagi, Kanagawa-ken (JP); Masahiro Baba, Kanagawa-ken (JP)

(72) Inventors: Ayako Takagi, Kanagawa-ken (JP); Shinichi Uehara, Tokyo (JP); Masako Kashiwagi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 284 days.

(21) Appl. No.: 13/730,201

(22) Filed: Dec. 28, 2012

(65) Prior Publication Data

US 2013/0258218 A1   Oct. 3, 2013

(30) Foreign Application Priority Data

Mar. 28, 2012   (JP) .................................. 2012-075205

(51) Int. Cl.
| | |
|---|---|
| *G02F 1/1335* | (2006.01) |
| *G02F 1/13* | (2006.01) |
| *G02F 1/1343* | (2006.01) |
| *G02F 1/29* | (2006.01) |
| *G02B 27/22* | (2006.01) |
| *H04N 13/04* | (2006.01) |

(52) U.S. Cl.
CPC ........ *G02F 1/1313* (2013.01); *G02F 1/134309* (2013.01); *G02F 1/29* (2013.01); *G02B 27/2214* (2013.01); *G02F 2001/294* (2013.01); *H04N 13/0404* (2013.01); *H04N 2213/001* (2013.01)
USPC .......................................................... 349/15

(58) Field of Classification Search
USPC ........................................................... 349/15
See application file for complete search history.

(56) References Cited

U.S. PATENT DOCUMENTS

| | | | |
|---|---|---|---|
| 7,425,951 B2 | 9/2008 | Fukushima et al. | |
| 2007/0035829 A1 | 2/2007 | Woodgate et al. | |
| 2011/0084961 A1 | 4/2011 | Son et al. | |
| 2011/0096252 A1 | 4/2011 | Im | |
| 2012/0105750 A1* | 5/2012 | Yoon et al. ...................... | 349/15 |
| 2012/0162592 A1 | 6/2012 | Takagi et al. | |

FOREIGN PATENT DOCUMENTS

| | | |
|---|---|---|
| JP | 2004-212666 | 7/2004 |
| JP | 2011-197640 | 10/2011 |

OTHER PUBLICATIONS

Notification of Reason(s) for Refusal issued by the Japanese Patent Office on Apr. 30, 2014, for Japanese Patent Application No. 2012-075205, and English-language translation thereof.

* cited by examiner

*Primary Examiner* — Lucy Chien
(74) *Attorney, Agent, or Firm* — Finnegan, Henderson, Farabow, Garrett & Dunner, L.L.P.

(57) ABSTRACT

According to one embodiment, an image display device includes a liquid crystal optical apparatus, an image display unit, and a control unit. The image display unit includes a display unit stacked with the liquid crystal optical apparatus. The control unit controls a potential of electrodes provided in the liquid crystal optical apparatus. Light including kth (k being an integer) major region parallax image is emitted outside the liquid crystal optical apparatus through a lens center portion. Light including kth adjacent region parallax image is emitted outside the liquid crystal optical apparatus through a refractive index increase portion.

20 Claims, 10 Drawing Sheets

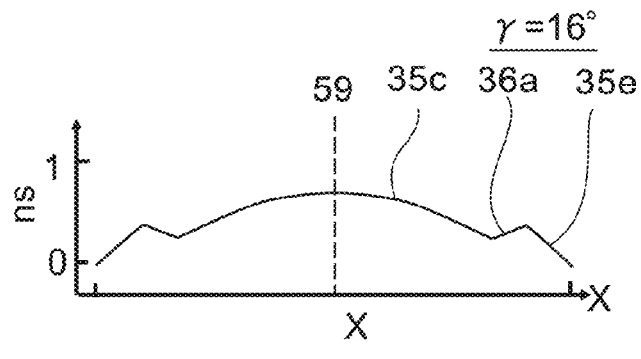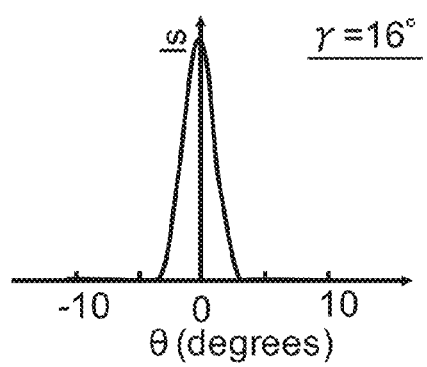
FIG. 3A        FIG. 3B
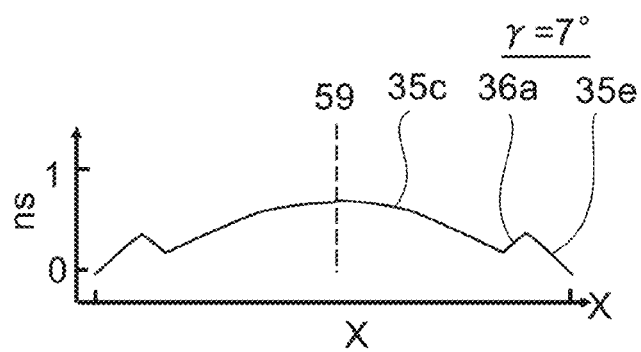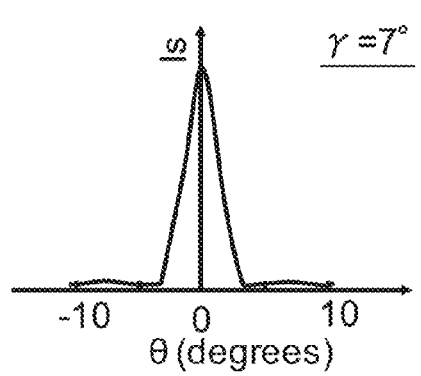
FIG. 3C        FIG. 3D
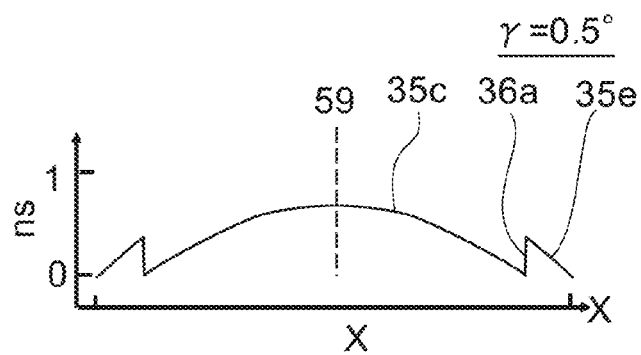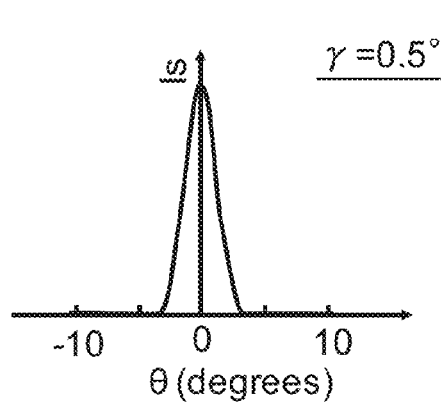
FIG. 3E        FIG. 3F

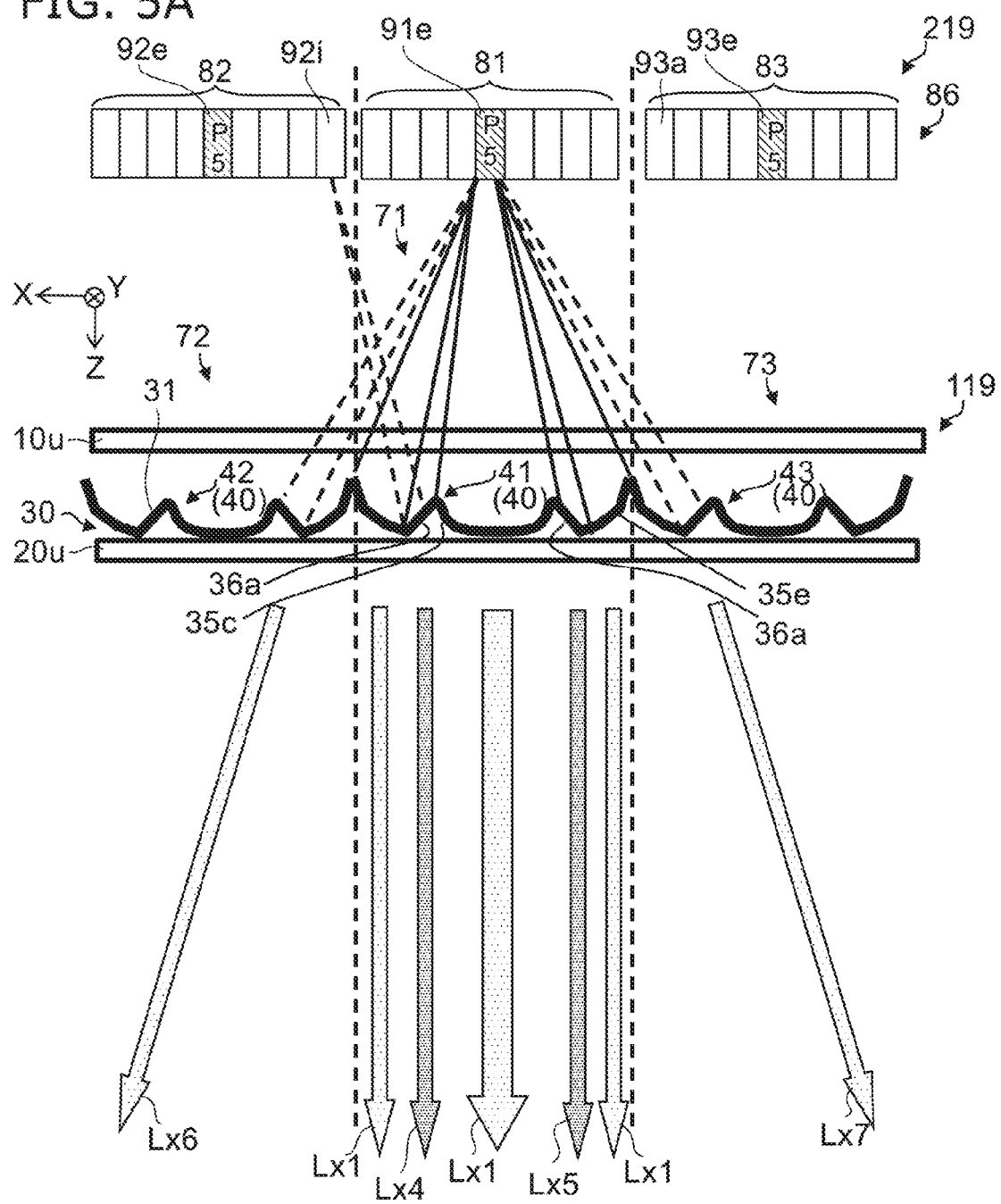
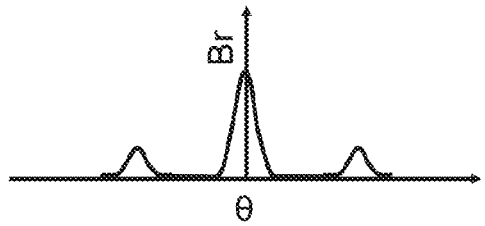

IMAGE DISPLAY DEVICE

CROSS-REFERENCE TO RELATED APPLICATIONS

This application is based upon and claims the benefit of priority from the prior Japanese Patent Application No.2012-075205, filed on Mar. 28, 2012; the entire contents of which are incorporated herein by reference.

FIELD

Embodiments described herein relate generally to an image display device.

BACKGROUND

A liquid crystal optical apparatus is known that utilizes the birefringence of liquid crystal molecules to change the distribution of the refractive index according to the application of a voltage. There is a stereoscopic image display device that combines such a liquid crystal optical apparatus with an image display unit.

Such a stereoscopic image display device switches between a state in which an image displayed on the image display unit is caused to be incident on the eyes of a human viewer as displayed on the image display unit and a state in which the image displayed on the image display unit is caused to be incident on the eyes of the human viewer as multiple parallax images by changing the distribution of the refractive index of the liquid crystal optical apparatus. Thereby, a two-dimensional display operation and a three-dimensional image display operation are realized. Also, technology is known that modifies the path of the light by utilizing the optical principle of a Fresnel zone plate. High display quality is desirable for such display devices.

BRIEF DESCRIPTION OF THE DRAWINGS

FIG. 3A to FIG. 3F are schematic views illustrating characteristics of image display devices;

FIG. 5A and FIG. 5B are schematic views illustrating characteristics of an image display device of a reference example;

DETAILED DESCRIPTION

Figure 1:
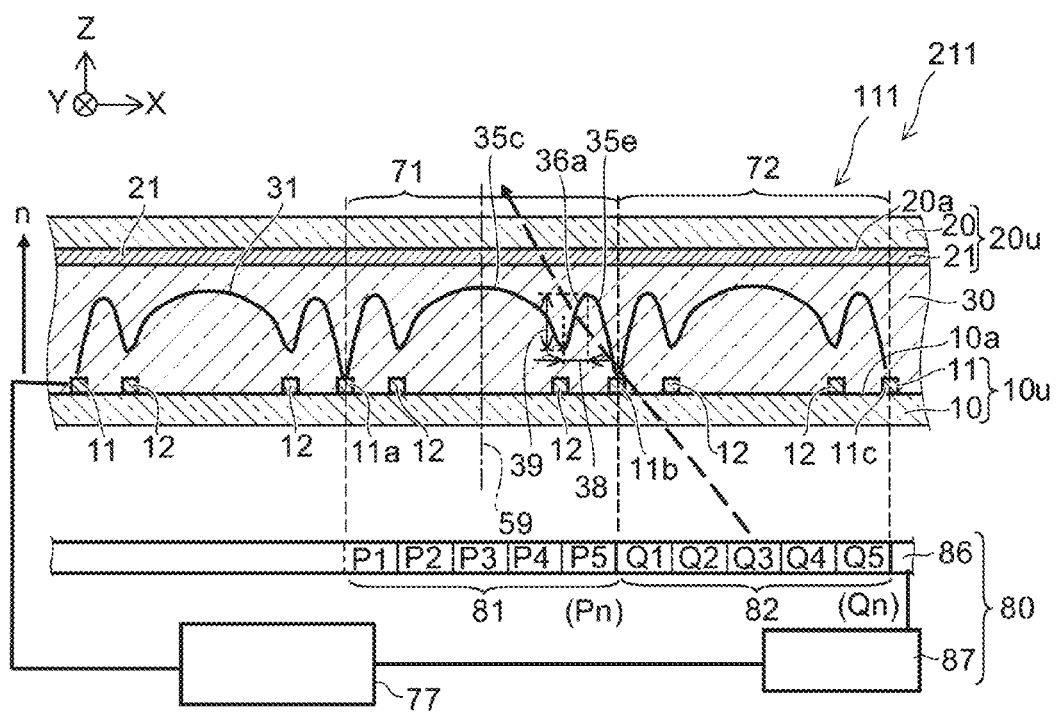
FIG. 1 is a schematic cross-sectional view illustrating the configuration of an image display device according to a first embodiment.
Figure 2A:
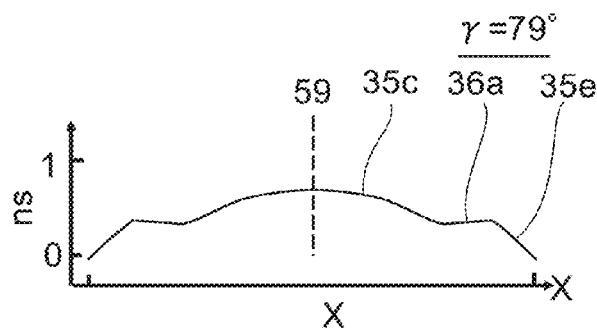
FIG. 2A to FIG. 2F are schematic views illustrating characteristics of image display devices.
Figure 2B:
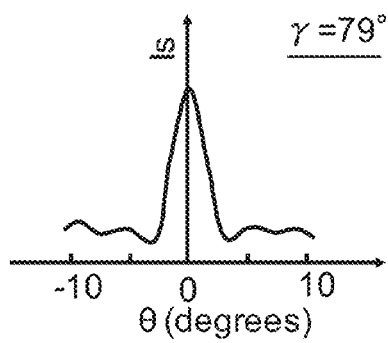
Figure 2C:
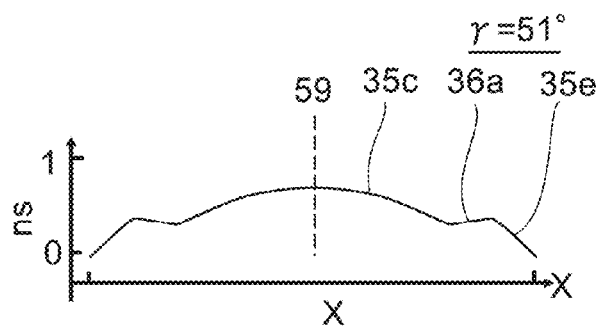
Figure 2D:
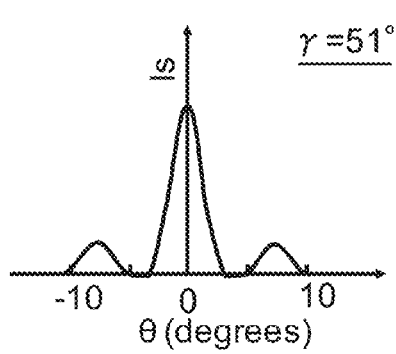
Figure 2E:
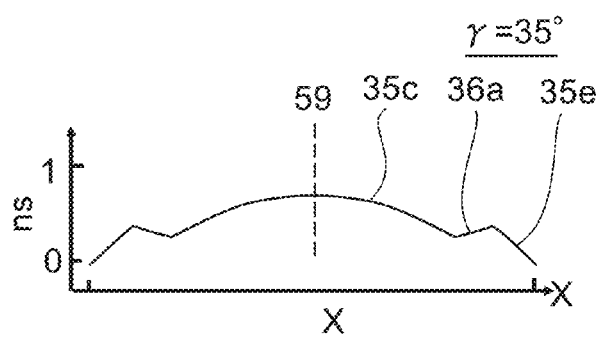
Figure 2F:
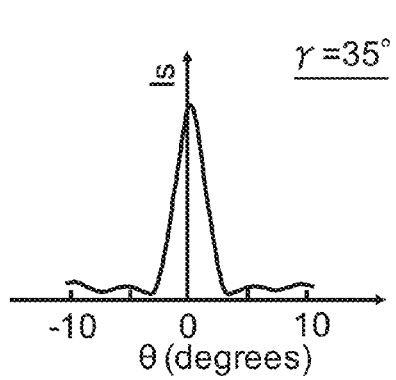

According to one embodiment, an image display device includes a liquid crystal optical apparatus, an image display unit, and a control unit. The liquid crystal optical apparatus includes a first substrate unit, a second substrate unit, and a liquid crystal layer. The first substrate unit includes a first substrate having a first major surface, a first major electrode provided on the first major surface to extend in a first direction, a second major electrode provided on the first major surface and separated from the first major electrode to extend in the first direction, a third major electrode provided on the first major surface to extend in the first direction, the second major electrode being disposed between the first major electrode and the third major electrode, and a first sub electrode provided on the first major surface between the first major electrode and the second major electrode and between the second major electrode and the third major electrode to extend in the first direction. The second substrate unit including a second substrate having a second major surface opposing the first major surface, and a first opposing electrode provided on the second major surface to oppose the first to third major electrodes. The liquid crystal layer is provided between the first substrate unit and the second substrate unit. The liquid crystal optical apparatus has a first lens region between the first major electrode and the second major electrode and a second lens region between the second major electrode and the third major electrode when projected onto a plane parallel to the first major surface.

The image display unit includes a display unit stacked with the liquid crystal optical apparatus. The display unit has a first elemental image region stacked with the first lens region and a second elemental image region stacked with the second lens region. The first elemental image region is configured to display first to Nth (N being an integer not less than 2) major region parallax images arranged in order in a second direction parallel to the plane and perpendicular to the first direction. The second elemental image region is configured to display first to Nth adjacent region parallax images arranged in order in the second direction.

The control unit is configured to control a potential of the first to third major electrodes, a potential of the first sub electrode, and a potential of the first opposing electrode. The control unit is configured to reduce a refractive index of the liquid crystal layer along an outward direction from a central axis toward the second major electrode in a lens center portion overlaying the central axis. The central axis is parallel to the first direction to pass through a midpoint of a line segment connecting a second-direction center of the first major electrode to a second-direction center of the second major electrode when projected onto the plane. The control unit is configured to reduce the refractive index along the outward direction in a lens end portion. The lens end portion is more proximal to the second major electrode than is the lens center portion when projected onto the plane. The control unit is configured to increase the refractive index along the outward direction in a first refractive index increase portion provided between the lens center portion and the lens end portion.

Light including the kth (k being an integer not less than 1 and not more than N) major region parallax image of the first elemental image region is emitted outside the liquid crystal optical apparatus through the lens center portion. Light including the kth adjacent region parallax image of the second elemental image region is emitted outside the liquid crystal optical apparatus through the first refractive index increase portion.

Embodiments of the invention will now be described with reference to the drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic cross-sectional view illustrating the configuration of an image display device according to a first embodiment.

As illustrated in FIG. 1, the image display device 211 according to this embodiment includes a liquid crystal optical apparatus 111, a control unit 77, and an image display unit 80.

The liquid crystal optical apparatus 111 includes a first substrate unit 10u, a second substrate unit 20u, and a liquid crystal layer 30.

The first substrate unit 10u includes a first substrate 10, multiple first electrodes 11, and multiple first sub electrodes 12.

The first substrate 10 has a first major surface 10a. The multiple first electrodes 11 are provided on the first major surface 10a. Each of the multiple first electrodes 11 extends in a first direction. The multiple first electrodes 11 are arranged along a second direction. The second direction is orthogonal to the first direction.

The first direction is taken as a Y-axis direction. The second direction is taken as an X-axis direction. A direction perpendicular to the X-axis direction and the Y-axis direction is taken as a Z-axis direction. The X-Y plane is parallel to the first major surface 10a. The X-axis direction is parallel to the first major surface 10a and perpendicular to the first direction.

Four of the multiple first electrodes 11 are illustrated in FIG. 1. The number of the multiple first electrodes 11 is arbitrary.

One of the multiple first electrodes 11 is taken as a first major electrode 11a; one other of the multiple first electrodes 11 is taken as a second major electrode 11b; and still one other of the multiple first electrodes 11 is taken as a third major electrode 11c. In other words, the first major electrode 11a is provided on the first major surface 10a to extend in the Y-axis direction. The second major electrode 11b is provided on the first major surface 10a and separated from the first major electrode 11a to extend in the Y-axis direction. The third major electrode 11c is provided on the first major surface 10a to extend in the Y-axis direction. The second major electrode 11b is disposed between the first major electrode 11a and the third major electrode 11c. There are cases hereinbelow where the first to third major electrodes 11a to 11c are generally referred to as the first electrodes 11.

The multiple first sub electrodes 12 are provided on the first major surface 10a between the multiple first electrodes 11. In other words, the first sub electrodes 12 are provided between the first major electrode 11a and the second major electrode 11b and between the second major electrode 11b and the third major electrode 11c. The first sub electrodes 12 extend in the Y-axis direction. Although two first sub electrodes 12 are provided in each of the regions between the multiple first electrodes 11 in this example, the number of the first sub electrodes 12 is arbitrary. For example, four or more first sub electrodes 12 may be provided in each of the regions between the multiple first electrodes 11.

The second substrate unit 20u includes a second substrate 20 and a first opposing electrode 21. The second substrate 20 has a second major surface 20a opposing the first major surface 10a. The first opposing electrode 21 is provided on the second major surface 20a. The first opposing electrode 21 opposes the first electrodes 11 (the first to third major electrodes 11a to 11c).

In the specification, the state of being opposed includes not only the state of directly facing each other but also the state of facing each other with another component inserted therebetween.

The liquid crystal layer 30 is provided between the first substrate unit 10u and the second substrate unit 20u.

The spacing between the first electrodes 11 is substantially constant. In other words, the distance along the X-axis direction between the X-axis direction center of the first major electrode 11a and the X-axis direction center of the second major electrode 11b is substantially equal to the distance along the X-axis direction between the X-axis direction center of the second major electrode 11b and the X-axis direction center of the third major electrode 11c.

The control unit 77 controls the potentials of the first electrodes 11 (the first to third major electrodes 11a to 11c ), the first sub electrodes 12, and the first opposing electrode 21. The control unit 77 is electrically connected to the first electrodes 11 (the first to third major electrodes 11a to 11c ), the first sub electrodes 12, and the first opposing electrode 21. For example, the control unit 77 applies a first voltage between the first opposing electrode 21 and the first electrodes 11. For example, the control unit 77 applies a second voltage between the first opposing electrode 21 and the first sub electrodes 12. Thereby, a refractive index distribution 31 is formed in the liquid crystal layer 30 by changing the alignment of the liquid crystal of the liquid crystal layer 30.

As illustrated in FIG. 1, the refractive index distribution 31 is formed in the liquid crystal layer 30 by the function of the control unit 77. FIG. 1 schematically illustrates the refractive index distribution 31.

The liquid crystal optical apparatus 111 may have a first lens region 71 between the first major electrode 11a and the second major electrode 11b and a second lens region 72 between the second major electrode 11b and the third major electrode 11c when projected onto a plane (the X-Y plane) parallel to the first major surface 10a. The refractive index distribution 31 in the second lens region 72 is substantially the same as the refractive index distribution 31 in the first lens region 71. The refractive index distribution 31 in the first lens region 71 will now be described.

The liquid crystal optical apparatus 111 includes a central axis 59 provided in the first lens region 71. The central axis 59 is parallel to the X-axis direction to pass through the midpoint of a line segment connecting the X-axis direction center of the first major electrode 11a to the X-axis direction center of the second major electrode 11b when projected onto the X-Y plane. For example, the refractive index distribution 31 has substantially line symmetry with respect to the Y-axis direction with the central axis 59 as an axis of symmetry. However, the refractive index distribution 31 may be asymmetric to obtain the desired optical characteristics or due to fluctuation of the manufacturing conditions, etc. Hereinbelow, the case of line symmetry is described to simplify the description.

Namely, the region between the central axis 59 and one of the first electrodes 11 (e.g., the second major electrode 11b) will be described as the refractive index distribution 31 in the first lens region 71.

The control unit 77 reduces the refractive index n of the liquid crystal layer 30 along an outward direction (the +X direction) from the central axis 59 toward the second major electrode 11b in a lens center portion 35c that overlays the central axis 59 when projected onto the X-Y plane.

The control unit 77 reduces the refractive index n along the outward direction in a lens end portion 35e that is more proximal to the second major electrode 11b than is the lens center portion 35c when projected onto the X-Y plane.

The refractive index n is increased along the outward direction in a first refractive index increase portion 36a provided between the lens center portion 35c and the lens end portion 35e. For example, the first refractive index increase portion 36a is proximal to or overlays the first sub electrode 12 when projected onto the X-Y plane.

Thus, portions where the refractive index n decreases and a portion where the refractive index n increases are provided in the first lens region 71. For example, the liquid crystal optical apparatus 111 has the optical characteristics of a Fresnel lens-like configuration. For example, the refractive index distribution 31 has a configuration corresponding to the distribution of the thickness of a Fresnel lens. The liquid crystal optical apparatus 111 functions as a liquid crystal GRIN lens (Gradient Index lens) in which the refractive index n changes in the plane.

An example is described in this embodiment in which each of the Fresnel lenses functions as a cylindrical lens. That is, each of the Fresnel lenses has a curvature in the X-axis direction of FIG. 1 and can control the direction of the light that is incident. On the other hand, in the Y axis, the direction of the light that is incident changes slightly as when passing through parallel-plane glass because there is no curvature. The cylindrical lens is but one example; and the configuration may function as an optical apparatus such as a fly-eye lens, etc.

The image display unit 80 includes a display unit 86. The image display unit 80 may further include a display drive unit 87.

The display unit 86 is stacked with the liquid crystal optical apparatus 111.

In the application, the state of being stacked includes not only the state of overlaying in direct contact but also the state of being overlaid with another component inserted therebetween.

The display unit 86 includes multiple elemental image regions. The multiple elemental image regions include a first elemental image region 81 and a second elemental image region 82. The first elemental image region 81 is stacked with the first lens region 71. The second elemental image region 82 is stacked with the second lens region 72.

Although a configuration is illustrated in this embodiment in which the positions of the elemental image region and the lens region match each other when projected onto the X-Y plane, a configuration in which the positions do not match may be used (for example, JP-A 2004-212666 (Kokai)). For example, the viewing zone can be controlled by disposing the elemental image regions such that the center of the elemental image region corresponding to the lens is shifted in the X-axis direction from the center of the lens region as the positions of the lens region and the elemental image region become distal to the center of the display unit 86 in the X-axis direction when projected onto the X-Y plane. Such an example is described below in regard to FIG. 8.

A signal including image information is supplied from the display drive unit 87 to the display unit 86. The display unit 86 produces light that is modulated based on this signal. For example, the display unit 86 emits light that includes multiple parallax images.

For example, the first elemental image region 81 displays the first to Nth (N being an integer not less than 2) major region parallax images P1 to Pn that are arranged in order in the X-axis direction. The second elemental image region 82 displays the first to Nth adjacent region parallax images Q1 to Qn that are arranged in order in the X-axis direction.

The case where N is 5 is illustrated in FIG. 1 for easier viewing. In the embodiment, N is arbitrary.

For example, the first to Nth major region parallax images P1 to Pn and the first to Nth adjacent region parallax images Q1 to Qn are images that include multiple parallax information for stereoscopic viewing. For example, a stereoscopic image is perceived by displaying the multiple parallax images and by the multiple parallax images being viewed via the lens formed from the liquid crystal optical apparatus 111.

The liquid crystal optical apparatus 111 has an operating state in which the optical path is modified (a state in which the refractive index distribution 31 is formed by a voltage being applied) and an operating state in which the optical path is substantially not modified (a state in which the refractive index distribution 31 is uniform without the voltage being applied).

For example, the image display device 211 provides a three-dimensional display by the light being incident on the liquid crystal optical apparatus 111 in the operating state in which the optical path is modified. For example, the image display device 211 provides a two-dimensional image display in the operating state in which the optical path is substantially not modified.

The image display unit 80 may include, for example, a liquid crystal display device, an organic EL display device, a plasma display, etc. The embodiment is not limited thereto; and any display device may be used as the image display unit 80.

The first substrate 10, the first electrodes 11, the first sub electrodes 12, the second substrate 20, and the first opposing electrode 21 are transmissive with respect to light. Specifically, these components are transparent.

The first substrate 10 and the second substrate 20 may include, for example, a transparent material such as glass, a resin, etc. The first substrate 10 and the second substrate 20 have plate configurations or sheet configurations. The thicknesses of the first substrate 10 and the second substrate 20 are, for example, not less than 50 micrometers ($\mu$m) and not more than 2000 $\mu$m. However, the thicknesses are arbitrary.

For example, the first electrodes 11, the first sub electrodes 12, and the first opposing electrode 21 include an oxide including at least one (one type) of element selected from the group consisting of In, Sn, Zn, and Ti. These electrodes may include, for example, ITO. For example, at least one selected from $In_2O_3$ and $SnO_3$ may be used. For example, the thicknesses of these electrodes are about 200 nanometers (nm) (e.g., not less than 100 nm and not more than 350 nm). For example, the thicknesses of the electrodes are set to be thicknesses to obtain a high transmittance with respect to visible light.

The disposition pitch of the first electrodes 11 (the distance between the X-axis direction centers of the most proximal first electrodes 11) is, for example, not less than 10 μm and not more than 1000 μm. The disposition pitch is set to meet the desired specifications (the characteristics of a gradient index lens).

For example, the length (the width) of the first electrode 11 along the X-axis direction is not less than 5 μm and not more than 300 μm.

For example, the length (a width w12) of the first sub electrode 12 along the X-axis direction is not less than 5 μm and not more than 300 μm.

The liquid crystal layer 30 includes a liquid crystal material. The liquid crystal material may include a nematic liquid crystal (having a nematic phase at the temperature of use of the liquid crystal optical apparatus 111). The liquid crystal material has a positive dielectric anisotropy or a negative dielectric anisotropy. In the case of the positive dielectric anisotropy, the initial alignment of the liquid crystal of the liquid crystal layer 30 (the alignment when a voltage is not applied to the liquid crystal layer 30) is, for example, a substantially horizontal alignment. In the case of the negative dielectric anisotropy, the initial alignment of the liquid crystal of the liquid crystal layer 30 is a substantially vertical alignment.

In the specification, in the case of the horizontal alignment, the angle (the pretilt angle) between the X-Y plane and the director (the long axis of the liquid crystal molecules) of the liquid crystal is not less than 0° and not more than 30°. In the case of the vertical alignment, for example, the pretilt angle is not less than 60° and not more than 90°. The director of the liquid crystal of at least one selected from the initial alignment and the alignment when the voltage is applied has a component parallel to the X-axis direction.

Herein, the case is described where the dielectric anisotropy of the liquid crystal included in the liquid crystal layer 30 is positive and the initial alignment is the substantially horizontal alignment.

In the case of the substantially horizontal alignment, the director is substantially parallel to the X-axis direction in the initial alignment when projected onto the X-Y plane. For example, the angle (the absolute value of the angle) between the director and the X-axis direction is not more than 15 degrees when projected onto the X-Y plane. The orientation direction of the liquid crystal layer 30 proximal to the first substrate unit 10u is antiparallel to the orientation direction of the liquid crystal layer 30 proximal to the second substrate unit 20u. In other words, the initial alignment is not a splay alignment.

The first substrate unit 10u may further include an alignment film (not illustrated). The first electrodes 11 and the first sub electrodes 12 are disposed between the first substrate 10 and the alignment film of the first substrate unit 10u. The second substrate unit 20u may further include an alignment film (not illustrated). The first opposing electrode 21 and a second opposing electrode 22 are disposed between the second substrate 20 and the alignment film of the second substrate unit 20u. These alignment films may include, for example, polyimide. The initial alignment of the liquid crystal layer 30 is obtained by, for example, performing rubbing of the alignment films. The direction of the rubbing of the first substrate unit 10u is antiparallel to the rubbing direction of the second substrate unit 20u. The initial alignment may be obtained by performing light irradiation of the alignment films.

The liquid crystal alignment of the liquid crystal layer 30 is changed by applying voltages between the first opposing electrode 21 and the first electrodes 11 and between the first opposing electrode 21 and the first sub electrodes 12. The refractive index distribution 31 is formed in the liquid crystal layer 30 according to this change; and the travel direction of the light that is incident on the liquid crystal optical apparatus 111 is changed by the refractive index distribution 31. The change of the travel direction of the light is mainly based on the refraction effect.

In the image display device 211 according to this embodiment as illustrated in FIG. 1, the light that includes the kth (k being an integer not less than 1 and not more than N) major region parallax image Pk of the first elemental image region 81 is emitted outside the liquid crystal optical apparatus 111 through the lens center portion 35c. The light that includes the kth adjacent region parallax image Qk of the second elemental image region 82 is emitted outside the liquid crystal optical apparatus 111 through the first refractive index increase portion 36a. In the embodiment, it is unnecessary for the relationship recited above to hold for all values of k. The relationship recited above may hold for any k that is not less than 1 and not more than N. Herein, k corresponds to the numeral of the viewpoint. For example, the image information displayed at a third major region parallax image P3 of the first elemental image region 81 and the image information displayed at a third adjacent region parallax image Q3 of the second elemental image region 82 are images that are imaged from the same viewpoint.

For example, k is 3 in the example illustrated in FIG. 1. In other words, the light that includes the third major region parallax image P3 of the first elemental image region 81 is emitted outside the liquid crystal optical apparatus 111 through the lens center portion 35c. The light that includes the third adjacent region parallax image Q3 of the second elemental image region 82 that is adjacent to the first elemental image region 81 is emitted outside the liquid crystal optical apparatus 111 through the first refractive index increase portion 36a.

Thereby, an image display device that provides a high-quality display can be provided.

The proportions of the vertical and horizontal scales in FIG. 1 are different from the actual scales for easier viewing. The lines illustrating the light are drawn schematically; and the angles of the lines do not always match the actual values.

In the embodiment as illustrated in FIG. 1, a liquid crystal GRIN lens is formed using the multiple first electrodes 11; and optical characteristics having a Fresnel lens-like configuration are obtained using the first sub electrodes 12. Thereby, this corresponds to reducing the thickness of the lens while obtaining the same optical characteristics. In the liquid crystal optical apparatus 111, the thickness of the liquid crystal layer 30 can be thin; and the amount of the liquid crystal material that is used can be reduced. Further, the response rate of the liquid crystal layer 30 increases.

In the lens center portion 35c and the lens end portion 35e of the refractive index distribution 31, the refractive index n decreases along the outward direction (the +X direction). In these portions, the refractive index n changes along the configuration of the lens. On the other hand, in the first refractive index increase portion 36a that is between the lens center portion 35c and the lens end portion 35e, the refractive index n increases along the outward direction; and the refractive index distribution 31 does not conform to the desired lens configuration.

In the case where the refractive index n increases gradually at the first refractive index increase portion 36a, the light that is incident on the first refractive index increase portion 36a is guided toward unintended directions. In other words, for example, stray light occurs. Therefore, for example, crosstalk occurs; and the display quality is low.

For example, in the case where it is intended for the light that includes the kth major region parallax image Pk of the first elemental image region 81 to pass through the first refractive index increase portion 36a when the light that includes the kth major region parallax image Pk passes through the lens center portion 35c, there are cases where the light that includes the (k−1)th major region parallax image P(k−1) or the (k+1)th major region parallax image P(k+1) passes through the first refractive index increase portion 36a.

For example, in the case where the kth major region parallax image Pk of the first elemental image region 81 is viewed through the lens center portion 35c from one viewpoint on the Z axis passing through the central axis 59, there are cases where the (k−1)th major region parallax image P(k−1) or the (k+1)th major region parallax image P(k+1) undesirably is viewed through the first refractive index increase portion 36a from this viewpoint.

This phenomenon becomes pronounced in the case where the change of the refractive index n of the first refractive index increase portion 36a is gradual.

To cause the change of the refractive index n of the first refractive index increase portion 36a to be abrupt, it may be considered to increase the voltage applied between the first opposing electrode 21 and the first sub electrodes 12. However, according to investigations of the inventor of the application, in the case where this voltage is increased, it was found that a reverse tilt region where the pretilt angle is reversed is formed on or around the first sub electrodes 12. Due to the reverse tilt region, stray light occurs, and crosstalk occurs.

Thus, the occurrence of the stray light that occurs at the first refractive index increase portion 36a has a trade-off relationship with the occurrence of the reverse tilt. Therefore, it has been difficult to provide a high-quality display.

Conventional design is based on the concept of causing the light that passes through the first refractive index increase portion 36a to pass through the same elemental image region as the light that passes through the lens center portion 35c. In other words, in the conventional design concept, in the case where the light that passes through the lens center portion 35c of the first lens region 71 passes through the first elemental image region 81, the light that passes through the first refractive index increase portion 36a of the first lens region 71 also is caused to pass through the first elemental image region 81. However, as recited above, the characteristics are not obtained as designed because there is a limit when causing the change of the refractive index n of the first refractive index increase portion 36a to be abrupt; and as a result, the quality of the display decreases.

In this embodiment, in the case where the light that passes through the lens center portion 35c of the first lens region 71 passes through the first elemental image region 81, the light that passes through the first refractive index increase portion 36a of the first lens region 71 is caused to pass through the adjacent second elemental image region 82. In other words, the first refractive index increase portion 36a is designed to correspond to a elemental image region that is different from the elemental image region that corresponds to the lens center portion 35c. In such a case, the occurrence of the reverse tilt recited above also is suppressed because the change of the refractive index n of the first refractive index increase portion 36a is gradual. Thereby, a high-quality display can be provided.

Because the corresponding elemental image regions are different between the light that passes through the lens center portion 35c of the first lens region 71 and the light that passes through the first refractive index increase portion 36a of the first lens region 71 in the embodiment, strictly speaking, a display is viewed in which the adjacent image information is mixed. However, the image information displayed at the third major region parallax image P3 and the image information displayed at the third adjacent region parallax image Q3 is image information that is proximal to each other in the image that is imaged from the same viewpoint. Therefore, the display quality does not degrade because there are many cases where the difference between the image information is less than that of the case where image information (e.g., P4, P5, Q1, Q2, etc.) having different viewpoints is mixed.

Herein, a width 38 along the X-axis direction of the first refractive index increase portion 36a is taken as δx. A change 39 of the refractive index of the first refractive index increase portion 36a is taken as δn.

FIG. 2A to FIG. 2F and FIG. 3A to FIG. 3F are schematic views illustrating characteristics of image display devices.

These drawings illustrate simulation results of the optical characteristics of image display devices in which a parameter (a tilt angle parameter γ) relating to the change rate of the refractive index of the first refractive index increase portion 36a of the refractive index distribution 31 formed in the liquid crystal optical apparatus is changed.

FIG. 2A, FIG. 2C, FIG. 2E, FIG. 3A, FIG. 3C, and FIG. 3E illustrate the refractive index distribution 31. In these drawings, the horizontal axis is the position in the X-axis direction. The vertical axis is a change ns (a normalized value) of the effective refractive index of the liquid crystal layer 30. The refractive index distribution 31 has line symmetry with the central axis 59 as an axis of symmetry.

The refractive index distributions 31 of the lens center portion 35c and the lens end portion 35e are controlled such that the focal distances due to the refractive index distributions of the lens center portion 35c and the lens end portion 35e match the lens-pixel distance (the distance between the liquid crystal layer 30 of the liquid crystal optical apparatus 111 and the light modulation unit of the display unit 86). This is implemented by controlling the voltages applied to the second major electrode 11b and the first sub electrode 12 by considering the relative positional relationship between the first sub electrode 12 and the second major electrode 11b.

Therefore, in FIG. 2A, FIG. 2C, FIG. 2E, FIG. 3A, FIG. 3C, and FIG. 3E, the refractive index distributions of the lens center portion 35c and the lens end portion 35e are corrected and are the same; and the tilt angle parameters γ of the refractive index of the first refractive index increase portion 36a with respect to the lens pitch direction (the X-axis direction) are different. The lens pitch is the distance along the X-axis direction between the X-axis direction centers of the first electrodes 11.

Using δn and δx recited above, the tilt of the refractive index of the first refractive index increase portion 36a is δn/δx.

The tilt angle parameter γ (in degrees (°)) is γ=90°−tan$^{-1}$(δn/δx)=tan$^{-1}$(δx/δn), where the units of δx are millimeters (mm). The tilt angle parameter γ corresponds to the angle of the tilt of the first refractive index increase portion 36a when the Z-axis direction is the reference.

In FIG. 2A, FIG. 2C, FIG. 2E, FIG. 3A, FIG. 3C, and FIG. 3E, the tilt angle parameter γ is 79 degrees, 51 degrees, 35 degrees, 16 degrees, 7 degrees, and 0.5 degrees, respectively. The tilt angle parameter γ being 16 degrees corresponds to δx/δn being 3.4 mm.

FIG. 2B, FIG. 2D, FIG. 2F, FIG. 3B, FIG. 3D, and FIG. 3F illustrate the optical characteristics of the image display devices having the refractive index distributions 31 illustrated in FIG. 2A, FIG. 2C, FIG. 2E, FIG. 3A, FIG. 3C, and FIG. 3E, respectively. In FIG. 2B, FIG. 2D, FIG. 2F, FIG. 3B, FIG. 3D, and FIG. 3F, the horizontal axis is a viewing angle θ.

The viewing angle θ being 0 corresponds to the state in which the light travels in the Z-axis direction. The vertical axis is an intensity Is (a normalized value) of the light. In this simulation, the number of the parallax images (i.e., N) is 9; and the display position of the fifth parallax image matches the position of the central axis 59 of the lens.

As illustrated in FIG. 2B, FIG. 2D, FIG. 2F, FIG. 3B, FIG. 3D, and FIG. 3F, the intensity Is of the light has a maximum when the viewing angle θ is 0 degrees. As the tilt of the refractive index (i.e., the tilt angle parameter γ) of the first refractive index increase portion 36a of the refractive index distribution 31 changes, a low peak occurs in the range where the viewing angle θ is 5 degrees to 10 degrees. This is caused by the travel direction of the light at the first refractive index increase portion 36a changing and the light of the images corresponding to the adjacent lens region entering the lens region of interest.

As illustrated in FIG. 2B, FIG. 2D, FIG. 2F, and FIG. 3F, the peak that occurs in the range of 5 degrees to 10 degrees is high when the tilt angle parameter γ is excessively small or excessively large. Conversely, as illustrated in FIG. 3B and FIG. 3D, the peak that occurs in the range where the viewing angle θ is 5 degrees to 10 degrees is low when the tilt angle parameter γ is 16 degrees and when the tilt angle parameter γ is 7 degrees. In particular, the peak of the range where the viewing angle θ is 5 degrees to 10 degrees substantially does not occur when the tilt angle parameter γ is 16 degrees. Also, the intensity Is of the light when the viewing angle θ is 0 degrees is high when the tilt angle parameter γ is 16 degrees.

In this example, the light of the elemental image region adjacent to the elemental image region of interest just passes through the first refractive index increase portion 36a of the lens region of interest when the tilt angle parameter γ of the first refractive index increase portion 36a is 16 degrees. Therefore, as recited above, the peak of the range where the viewing angle θ is 5 degrees to 10 degrees substantially does not occur; and the intensity Is of the light when the viewing angle θ is 0 degrees is high.

Similar to the good characteristics obtained as recited above in the range where the tilt angle parameter γ is not less than 7 degrees and not more than 16 degrees, good characteristics are obtained in the range where the tilt angle parameter γ is not less than 16 degrees and not more than 25 degrees. In other words, good characteristics are obtained at least for tilt angle parameters γ in the range of 16±9 degrees.

Figures 4A, 4B:
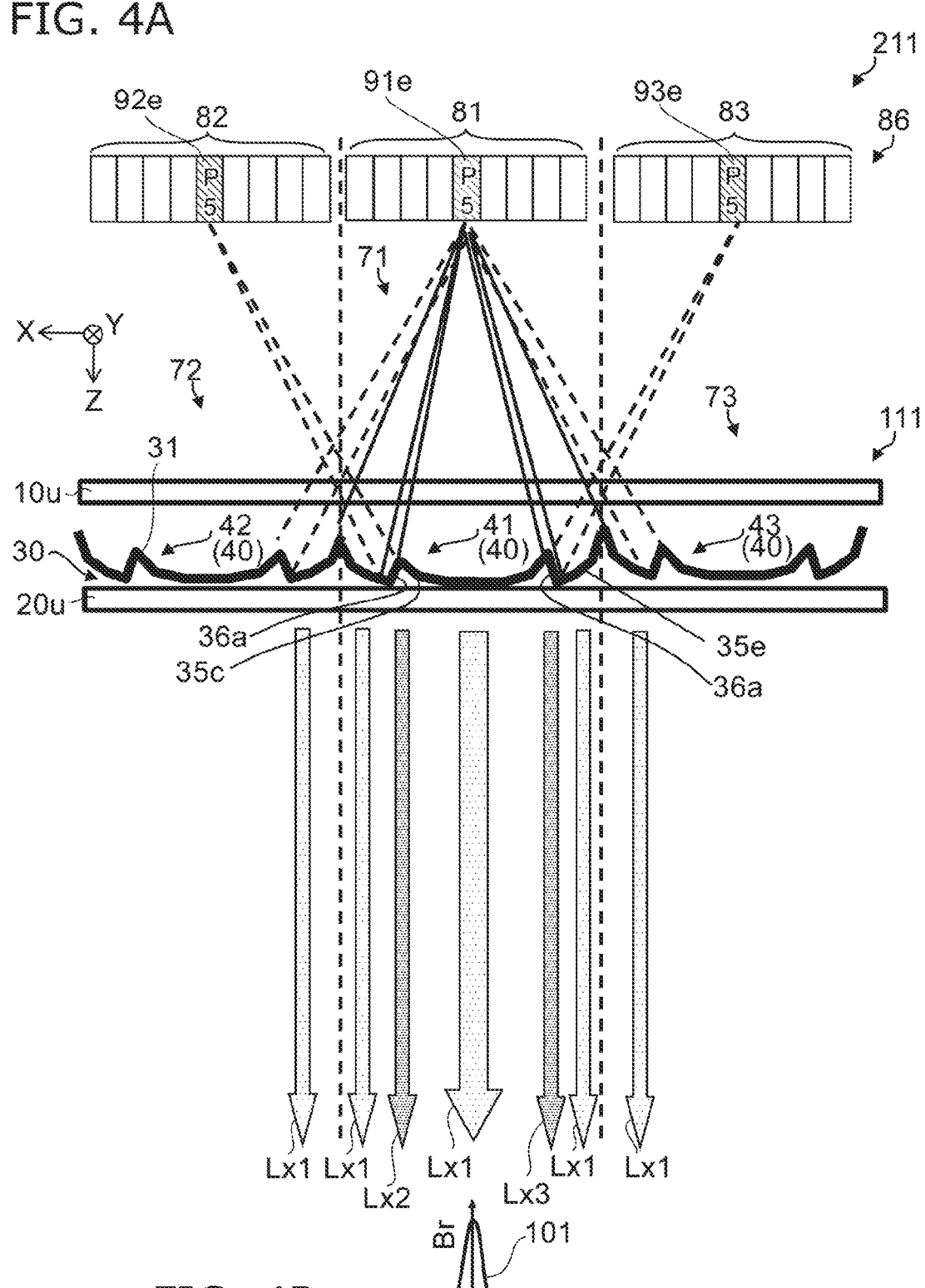
FIG. 4A and FIG. 4B are schematic views illustrating characteristics of the image display device according to the first embodiment.

FIG. 4A and FIG. 4B are schematic views illustrating characteristics of the image display device according to the first embodiment.

FIG. 4A is a schematic view of the image display unit 80 and the liquid crystal optical apparatus 111 when viewed along the Y-axis direction.

As illustrated in FIG. 4A, the first elemental image region 81 of the display unit 86 is disposed between the second elemental image region 82 and a third elemental image region 83. The first elemental image region 81 includes a fifth elemental image 91e to which the image information corresponding to the viewpoint numeral of 5 is written. Similarly, the second elemental image region 82 includes a fifth elemental image 92e to which the image information corresponding to the viewpoint numeral of 5 is written. Also, the third elemental image region 83 includes a fifth elemental image 93e to which the image information corresponding to the viewpoint numeral of 5 is written.

FIG. 4A is a model-like illustration of the characteristics when the fifth elemental images 91e to 93e of the first to third elemental image regions 81 to 83 are turned on and the other elemental images are turned off. The distribution of the pencils of light rays are illustrated in this drawing.

As illustrated in FIG. 4A, the liquid crystal optical apparatus 111 is stacked with the display unit 86. As recited above, the refractive index distribution 31 is formed in the liquid crystal optical apparatus 111. The first lens region 71 is disposed to correspond to the first elemental image region 81; the second lens region 72 is disposed to correspond to the second elemental image region 82; and a third lens region 73 is disposed to correspond to the third elemental image region 83. A first lens 41 is formed in the first lens region 71; a second lens 42 is formed in the second lens region 72; and a third lens 43 is formed in the third lens region 73. The second lens 42 and the third lens 43 are lenses that are adjacent to the first lens 41.

The refractive index distribution 31 of each of these lenses 40 (the first to third lenses 41 to 43) includes the lens center portion 35c, the lens end portion 35e, and the first refractive index increase portion 36a described in regard to FIG. 1. For example, the characteristics of the first refractive index increase portion 36a correspond to the case illustrated in FIG. 3A and FIG. 3B where the tilt angle parameter is 16 degrees.

As illustrated in FIG. 4A, the light of the fifth elemental image 91e of the first elemental image region 81 passes through the lens center portion 35c and the lens end portion 35e of the first lens 41. This light is emitted in the frontward direction of the first lens 41 as a pencil of light rays Lx1 which is an enlargement of the fifth elemental image 91e.

The light of the fifth elemental image 92e of the second elemental image region 82 passes through the first refractive index increase portion 36a of the first lens 41 (on the left side in FIG. 4A). This light is emitted in the frontward direction of the first lens 41 as a pencil of light rays Lx2 which is an enlargement of the fifth elemental image 92e.

The light of the fifth elemental image 93e of the third elemental image region 83 passes through the first refractive index increase portion 36a of the first lens 41 (on the right side in FIG. 4A). This light is emitted in the frontward direction of the first lens 41 as a pencil of light rays Lx3 which is an enlargement of the fifth elemental image 93e.

Thus, the parallax image that passes through the first lens 41 and is displayed in the frontward direction is the fifth elemental image information that corresponds to the same (a common) viewpoint.

Thus, in the case where the tilt angle of the first refractive index increase portion 36a is appropriate, pencils of light rays of elemental images having other parallax image information are not mixed.

FIG. 4B illustrates the simulation results of a luminance profile at a prescribed viewing distance of the light rays that are emitted from the fifth elemental image 91e to pass through the first lens 41 and the adjacent lenses (the second lens 42 and the third lens 43). In FIG. 4B, the horizontal axis is the viewing angle θ (the observation angle); and the vertical axis is a luminance Br.

As illustrated in FIG. 4B, the luminance has one peak. This illustrates that the light that is emitted from the fifth elemental image 91e passes through the lens center portion 35c and the lens end portion 35e of the first lens 41 and is emitted in the frontward direction of the first lens 41. This also illustrates that the pencil of light rays that passes through the first refractive index increase portion 36a of the second lens 42 is emitted in the frontward direction of the first lens 41, and the pencil of light rays that passes through the first refractive index increase portion 36a of the third lens 43 is emitted in the frontward direction of the first lens 41. A state can be formed in which the pencils of light rays of the elemental images having other parallax image information are substantially not mixed by appropriately setting the tilt of the first refractive index increase portion 36a (i.e., the tilt angle parameter γ).

In this example, the position of the minimum value of the refractive index at the first refractive index increase portion 36a is at a distance of 80% of ½ of the lens pitch from the lens center (the central axis 59); and the thickness of the liquid crystal layer 30 is not more than 1/10 of the lens pitch. In such a case, when the tilt angle parameter γ is about 16 degrees, the mixing of the other parallax images into the pencils of light rays from the lenses 40 can be suppressed.

FIG. 5A and FIG. 5B are schematic views illustrating the characteristics of an image display device of a reference example. These drawings illustrate the configuration and the characteristics of a liquid crystal optical apparatus 119 of the reference example, and the image display device 219 of the reference example that uses the liquid crystal optical apparatus 119.

FIG. 5A is a schematic view when the image display unit 80 and the liquid crystal optical apparatus 119 are viewed along the Y-axis direction.

In the image display device 219 of the reference example as illustrated in FIG. 5A, the first to third lens regions 71 to 73 are disposed to correspond to the first to third elemental image regions 81 to 83. The first to third lenses 41 to 43 (the lenses 40) are formed in the first to third lens regions 71 to 73. The refractive index distribution 31 of the lenses 40 of the liquid crystal optical apparatus 119 of the reference example is different from that of the case of the liquid crystal optical apparatus 111 according to the embodiment. Specifically, the tilt angle parameter γ of the first refractive index increase portion 36a of the liquid crystal optical apparatus 119 is different from the tilt angle parameter γ of the first refractive index increase portion 36a of the liquid crystal optical apparatus 111. The tilt angle parameter γ of the first refractive index increase portion 36a of the liquid crystal optical apparatus 119 is 51 degrees.

In the liquid crystal optical apparatus 119 as well, the light of the fifth elemental image 91e of the first elemental image region 81 passes through the lens center portion 35c and the lens end portion 35e of the first lens 41 and is emitted in the frontward direction of the first lens 41 as the pencil of light rays Lx1 which is an enlargement of the fifth elemental image 91e.

On the other hand, for example, the light of a ninth elemental image 92i of the second elemental image region 82 passes through the first refractive index increase portion 36a of the first lens 41 (on the left side in FIG. 5A). This light is emitted in the frontward direction of the first lens 41 as a pencil of light rays Lx4 which is an enlargement of the ninth elemental image 92i of the second elemental image region 82.

For example, the light of a first elemental image 93a of the third elemental image region 83 passes through the first refractive index increase portion 36a of the first lens 41 (on the right side in FIG. 5A). This light is emitted in the frontward direction of the first lens 41 as a pencil of light rays Lx5 which is an enlargement of the first elemental image 93a of the third elemental image region 83.

Therefore, the fifth elemental image 91e of the first elemental image region 81, the ninth elemental image 92i of the second elemental image region 82, and the first elemental image 93a of the third elemental image region 83 are mixed in the parallax image that is emitted toward the front of the first lens 41. Therefore, degradation of the stereoscopic display image such as double images, blurring, etc., occurs.

Further, the light of the fifth elemental image 91e of the first elemental image region 81 is incident on the first refractive index increase portion 36a of the second lens 42 and the first refractive index increase portion 36a of the third lens 43 and is emitted as a pencil of light rays Lx6 and a pencil of light rays Lx7. The angles (the angles from the Z-axis direction) of the pencil of light rays Lx6 and the pencil of light rays Lx7 are different from the angle of the pencil of light rays Lx1.

FIG. 5B illustrates simulation results of the luminance profile at a prescribed viewing distance of the light ray that is emitted from the fifth elemental image 91e to pass through the first lens 41 and the adjacent lenses (the second lens 42 and the third lens 43) of the liquid crystal optical apparatus 119.

As illustrated in FIG. 5B, the luminance Br has peaks other than the peak at the position of the frontward direction (θ=0 degrees). The peak of the frontward direction corresponds to the pencil of light rays that passes through the lens center portion 35c and the lens end portion 35e of the first lens 41; and the other peaks correspond to, for example, the pencils of light rays that pass through the first refractive index increase portions 36a of the second lens 42 and the third lens 43. Such other peaks occur and become high when the tilt angle parameter γ of the first refractive index increase portion 36a is inappropriate. Degradation of the 3D display occurs due to the other peaks.

Figure 6:
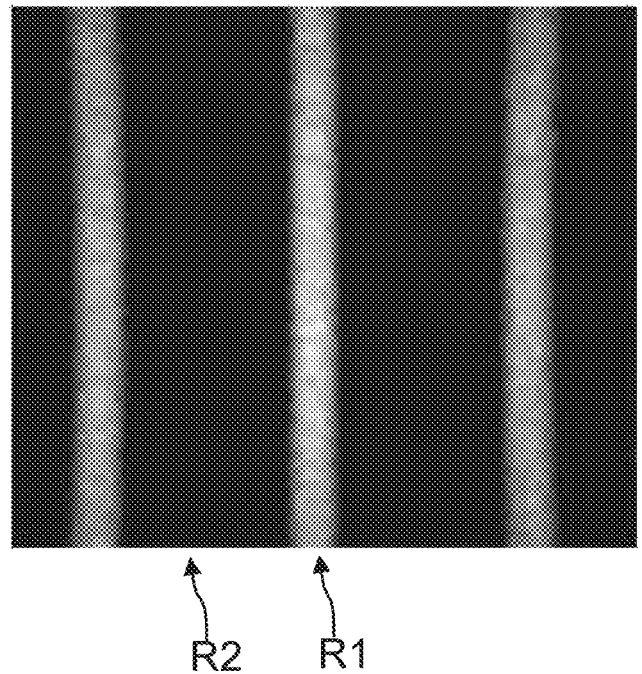
FIG. 6 is a schematic view illustrating characteristics of the image display device according to the first embodiment.

FIG. 6 is a schematic view illustrating characteristics of the image display device according to the first embodiment.

Figure 7:
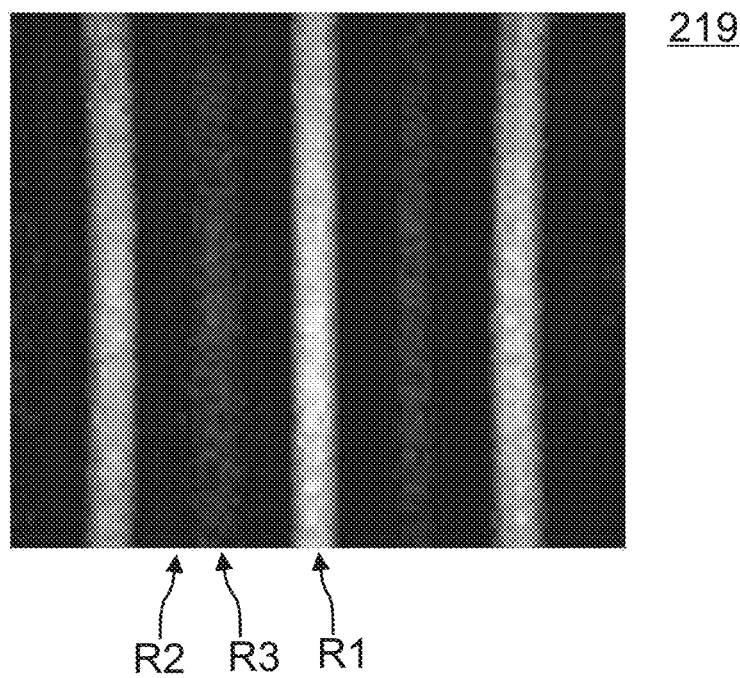
FIG. 7 is a schematic view illustrating characteristics of the image display device of the reference example.

FIG. 7 is a schematic view illustrating characteristics of the image display device of the reference example.

These drawings illustrate the simulation images of the luminance distribution observed for the liquid crystal optical apparatuses 111 and 119 recited above when the display unit 86 displays one parallax elemental image. FIG. 6 corresponds to when the tilt angle parameter γ is 16 degrees; and FIG. 7 corresponds to when the tilt angle parameter γ is 51 degrees. As the one parallax elemental image, the fifth elemental image is turned on and the other elemental images are turned off. In these drawings, the bright portions correspond to portions where the luminance is high; and the dark portions correspond to portions where the luminance is low.

In the image display device 219 of the reference example (γ=51 degrees) as illustrated in FIG. 7, the three types of patterns of a bright band-like portion (a bright region R1), a dark band-like portion (a dark region R2), and a band-like portion having intermediate brightness (an intermediate region R3) are observed. The intermediate region R3 corresponds to a peak of the light that is emitted in a direction that is different from the intended emission position. This state causes the stereoscopic image to degrade.

Conversely, in the image display device 211 according to the embodiment (γ=16 degrees) as illustrated in FIG. 6, the two types of patterns of the bright band-like portion (the bright region R1) and the dark band-like portion (the dark region R2) are observed; and the intermediate region R3 is not observed. In the image display device 211, the light is emitted at the intended emission position; and a good stereoscopic image is displayed.

Thus, for example, it can be determined whether or not the light is incident on a different parallax region by whether or not the intermediate region R3 is observed in addition to the multiple bright regions R1 and the dark region R2 between the bright regions R1 as viewed by the human viewer when only one parallax image is turned on. The tilt of the first refractive index increase portion 36a (i.e., the tilt angle parameter γ) can be estimated based on the position between the bright regions R1 where the intermediate region R3 appears.

In the embodiment, for example, k is not less than 2. In such a case, the ratio of the luminance of the light that includes the (k−1)th adjacent region parallax image Q(k−1) of the second elemental image region 82 that is emitted outside the liquid crystal optical apparatus 111 through the first refractive index increase portion 36a to the luminance of the light that includes the kth adjacent region parallax image Qk of the second elemental image region 82 that is emitted outside the liquid crystal optical apparatus 111 through the first refractive index increase portion 36a is not more than 0.2.

The ratio of the luminance of the light that includes the (k+1)th adjacent region parallax image Q(k+1) of the second elemental image region 82 that is emitted outside the liquid crystal optical apparatus 111 through the first refractive index increase portion 36a to the luminance of the light that includes the kth adjacent region parallax image Qk of the second elemental image region 82 that is emitted outside the liquid crystal optical apparatus 111 through the first refractive index increase portion 36a is not more than 0.2.

Figure 8:
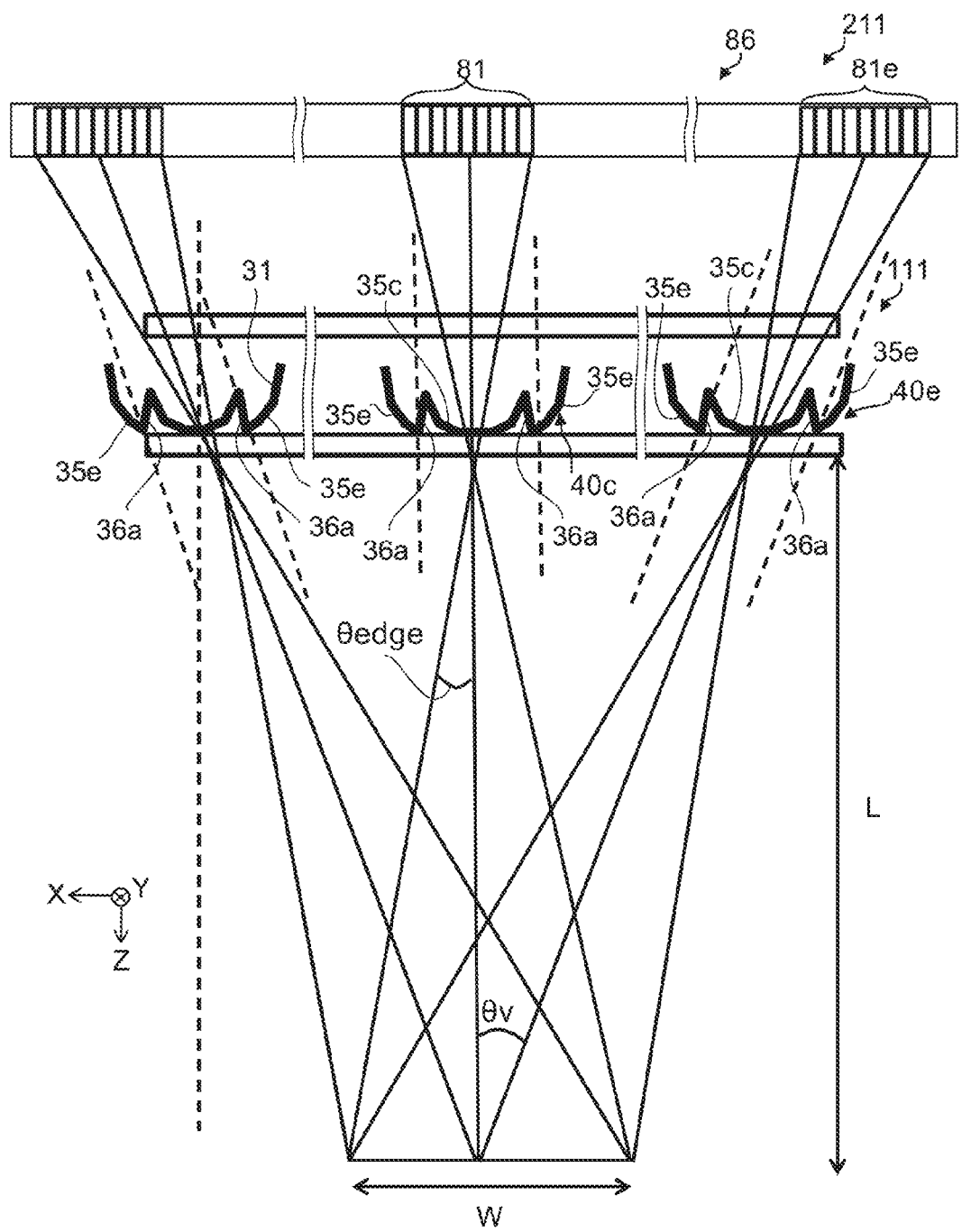
FIG. 8 is a schematic view illustrating the configuration and the operation of the image display device according to the embodiment.

FIG. 8 is a schematic view illustrating the configuration and the operation of the image display device according to the embodiment.

FIG. 8 is a schematic view of the image display unit 80 and the liquid crystal optical apparatus 111 when viewed along the Y-axis direction.

As illustrated in FIG. 8, the angle (the angle for which the normal direction of the display surface of the image display device 211 is the reference) at which the light emitted from the first elemental image region 81 can be observed is taken as a half viewing zone angle θedge. The viewing zone angle (the entire angle) is 2×θedge. A viewing zone width W at a viewing distance L is W=2×L×tan(θedge).

As illustrated in FIG. 8, a central lens 40c that corresponds to the position of the center of the screen of the image display device 211 is formed. The center of the central lens 40c is positioned on a straight line connecting the center of the viewing zone width W at the viewing distance L to the center of the elemental image region (e.g., the first elemental image region 81) of the center of the screen. Even in the case where the position (the viewing position) of the eye of the human viewer moves in the left and right direction (the X-axis direction) within the viewing zone width W, the image information of the viewpoint that corresponds to the viewing position can be observed.

On the other hand, an end lens 40e that corresponds to the position of the end of the screen of the image display device 211 is formed. For example, the center of the end lens 40e is positioned on a straight line connecting the center of the viewing zone width W at the viewing distance L to the center of the elemental image region of the end of the screen (e.g., a screen end elemental image region 81e). Thereby, the human viewer at the position corresponding to the screen center at the viewing distance L can observe the image information corresponding to this viewpoint for the entire image display device 211.

When the eye of the human viewer is within the range of the viewing zone width W, the human viewer can view the parallax image that corresponds to the position of the eye of the human viewer even when moving left and right within the viewing zone width W. For example, the viewing zone of the image display device 211 can be enlarged as an entirety by shifting the center of the screen end elemental image region 81e toward the end of the display unit 86 with the center of the end lens 40e as a reference. In such a case, the angle between the eye of the human viewer and the center of the end lens 40e is taken as an angle θv from the human viewer.

The refractive index distribution 31 occurs in the liquid crystal optical apparatus 111 due to the tilting of the liquid crystal molecules. In the end lens 40e, the light of the screen end elemental image region 81e is tilted when incident on the end lens 40e. Therefore, the angle of the light that is incident on the first refractive index increase portion 36a of the end lens 40e is different from the angle of the light that is incident on the first refractive index increase portion 36a of the central lens 40c. It is more desirable for the tilt of the first refractive index increase portion 36a of the end lens 40e to be corrected according to the angle θv from the human viewer by considering this difference.

The case where the angle θv from the human viewer is 30 degrees will now be described. For example, an angle θv1 inside the liquid crystal layer 30 that corresponds to the angle θv from the human viewer is as follows from Snell's law by using the refractive index $n_0$ of air and the average refractive index nx of the liquid crystal layer 30.

$$\sin(\theta v) \times n0 = \sin(\theta v1) \times nx$$

When the refractive index of the air is about 1 and the average refractive index nx of the liquid crystal layer 30 is about 1, this becomes $$\sin(\theta v) = 1.5 \times \sin(\theta v1)$$

and the angle θv1 inside the liquid crystal layer 30 is about 20 degrees.

For example, in the central lens 40c and the end lens 40e, the tilt angle parameter γ of the first refractive index increase portion 36a is 16 degrees. In such a case, in the case where the angle θv1 inside the liquid crystal layer 30 that corresponds to the angle θv from the human viewer is 20 degrees, the angle (the angle having the first refractive index increase portion 36a as the reference) of the light that passes through the first refractive index increase portion 36a positioned on the left side of the end lens 40e which is positioned at the right end of the screen is −4 degrees (16 degrees−20 degrees). Thus, the tilt of the first refractive index increase portion 36a positioned on the left side is substantially parallel to the light that passes through this portion. Thereby, in the end lens 40e as well, light that passes through the first refractive index increase portion 36a and is emitted in a direction different from the desired direction is suppressed.

The angle between the first refractive index increase portion 36a positioned on the right side of the end lens 40e which is positioned at the right end of the screen and the optical path of the light that is incident on this portion is large. However, this is practically not much of a problem because the proportion of the state in which the human viewer views the screen center is high. In the end lens 40e which is positioned at the right end of the screen as well, it is favorable for the angle between the first refractive index increase portion 36a and the optical path of the light that is incident on this portion to be, for example, not more than 35 degrees. Thereby, the peak value of the interference luminance occurring in the opposite parallax direction can be suppressed; and a practical high-quality display can be provided.

In the end lens 40e, the refractive index distribution 31 may be asymmetric (having different characteristics between the center and the end side). Thereby, a higher-quality display can be provided.

In the example recited above, good characteristics are obtained when the tilt angle parameter γ is 16±9 degrees. In this example, a birefringence Δn of the liquid crystal of the liquid crystal layer 30 (the difference between the refractive index $n_e$ with respect to extraordinary light and the refractive index $n_0$ with respect to ordinary light) is about 0.2. The change ($\delta n$) of the refractive index at the first refractive index increase portion 36a is about 0.07. The lens pitch Ip (i.e., the distance between the X-axis direction centers of the most proximal first electrodes 11) is 0.5 mm. The distance xf along the X-axis direction between the central axis 59 and the position where the refractive index of the first refractive index increase portion 36a is a minimum (the distance from the central axis 59 to the Fresnel jump) is 0.135 mm. The distance xf corresponds to the distance along the X-axis direction between the central axis 59 and the X-axis direction center of the first sub electrode 12. An example in which the tilt angle parameter γ is changed by changing the width ($\delta x$) of the first refractive index increase portion 36a along the X-axis direction in the case of such conditions is described above.

$\delta n/\delta x$ which is the tilt of the refractive index of the first refractive index increase portion 36a can be transformed into a tilt (a normalized tilt α) that is normalized as follows using Δn and the lens pitch Ip recited above.

$$\alpha=(\delta n/\Delta n)/(\delta x/Ip)$$

The normalized tilt α is 0.46, 1.86, 3.32, 4.98, 7.89, 19.1, and 234 when the tilt angle parameter γ is 79 degrees, 51 degrees, 35 degrees, 25 degrees, 16 degrees, 7 degrees, 0.5 degrees, respectively.

Thus, in the embodiment, good characteristics can be obtained by the normalized tilt α being about 7.89 (e.g., not less than 4.98 and not more than 19.1).

As described below, there are cases where multiple refractive index increase portions are provided between the central axis 59 and the lens end. In such a case, for example, the distance xf recited above is applied to the refractive index increase portion that is most proximal to the central axis along the X-axis direction.

Second Embodiment

Figure 9:
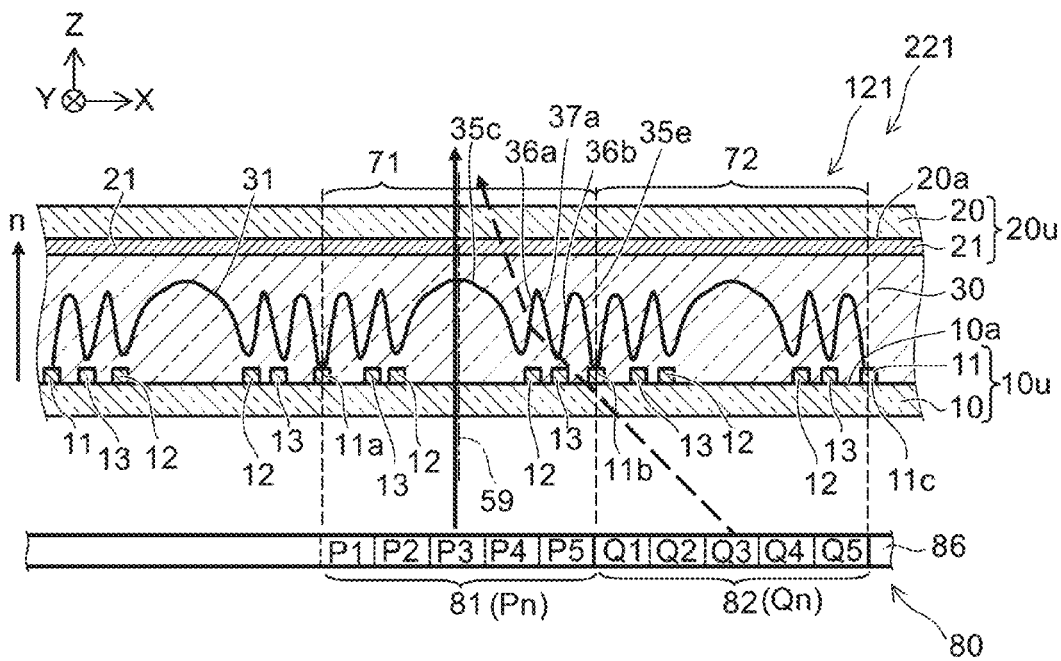
FIG. 9 is a schematic cross-sectional view illustrating the configuration of an image display device according to a second embodiment.

FIG. 9 is a schematic cross-sectional view illustrating the configuration of an image display device according to a second embodiment.

In a liquid crystal optical apparatus 121 of the image display device 221 according to this embodiment as illustrated in FIG. 9, the first substrate unit 10u further includes a second sub electrode 13. For example, the first sub electrode 12 is provided between the second major electrode 11b and the central axis 59 of the first lens region 71, and the second sub electrode 13 is disposed between the first sub electrode 12 and the second major electrode 11b when projected onto the X-Y plane. Otherwise, the image display device 221 and the liquid crystal optical apparatus 121 are similar to the image display device 211 and the liquid crystal optical apparatus 111. The control unit 77 and the display drive unit 87 are not illustrated in FIG. 9.

The potential of the second sub electrode 13 is further controlled. In this example, the refractive index distribution 31 that is formed by the control unit 77 further includes a second refractive index increase portion 36b. In other words, the control unit 77 increases the refractive index of the liquid crystal layer 30 along the outward direction (the +X direction) at the second refractive index increase portion 36b provided between the first refractive index increase portion 36a and the lens end portion 35e in the first lens region 71. Further, the control unit 77 reduces the refractive index along the outward direction at the portion (a first refractive index decrease portion 37a) between the first refractive index increase portion 36a and the second refractive index increase portion 36b.

In this example, optical characteristics having a Fresnel lens-like configuration including multiple subordinate lenses are obtained. Thereby, for example, this is advantageous because the thickness of the liquid crystal layer 30 to obtain the desired optical characteristics can be reduced further.

In such a case as well, the light that includes the kth major region parallax image Pk of the first elemental image region 81 is emitted outside the liquid crystal optical apparatus 121 through the lens center portion 35c; and the light that includes the kth adjacent region parallax image Qk of the second elemental image region 82 is emitted outside the liquid crystal optical apparatus 121 through the first refractive index increase portion 36a. The occurrence of the reverse tilt can be suppressed; the stray light can be suppressed; and a high-quality display can be provided.

The second sub electrode 13 may include, for example, the material described in regard to the first sub electrode 12. Although the two types of the first sub electrode 12 and the second sub electrode 13 are provided as sub electrodes in this example, another sub electrode may be further provided. The number of the sub electrodes is arbitrary.

Figure 10:
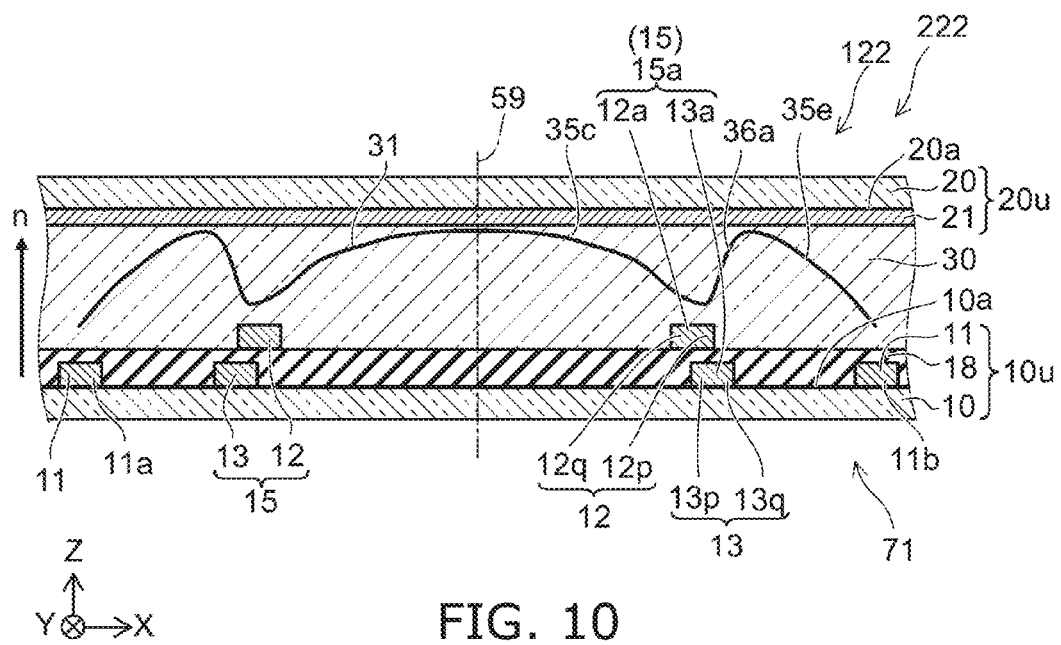
FIG. 10 is a schematic cross-sectional view illustrating the configuration of another image display device according to the second embodiment.

FIG. 10 is a schematic cross-sectional view illustrating the configuration of another image display device according to the second embodiment.

In FIG. 10, a portion of the liquid crystal optical apparatus is illustrated, and the control unit 77 and the image display unit 80 are not illustrated. The first lens region 71 is displayed for easier viewing of the drawing. The configuration of the second lens region 72 is similar to the configuration of the first lens region 71. The relationship between the first lens region 71 and the first elemental image region 81 and the relationship between the second lens region 72 and the second elemental image region 82 are similar to those of the first embodiment or the image display device 211.

In a liquid crystal optical apparatus 122 (and the image display device 222) according to this embodiment as illustrated in FIG. 10, the first sub electrode 12 (a first sub electrode 12a) is disposed at least between the central axis 59 and the second major electrode 11b when projected onto the X-Y plane. The first substrate unit 10u further includes the second sub electrode 13 (a second sub electrode 13a) and an insulating layer 18. The second sub electrode 13 is provided on the first major surface 10a to extend in the Y-axis direction. The insulating layer 18 is provided between the first sub electrode 12 and the second sub electrode 13.

In this example, the insulating layer 18 is disposed between the first sub electrode 12 and the first substrate 10; and the second sub electrode 13 is disposed between the first substrate 10 and a portion of the insulating layer 18. However, the embodiment is not limited thereto. The insulating layer 18 may be disposed between the second sub electrode 13 and the first substrate 10; and the first sub electrode 12 may be disposed between the first substrate 10 and a portion of the insulating layer 18.

The position of the first sub electrode 12 along the X-axis direction is shifted from the position of the second sub electrode 13 along the X-axis direction. The first sub electrode 12 has a first superimposed portion 12p overlaying the second sub electrode 13 and a first non-superimposed portion 12q not overlaying the second sub electrode 13 when projected onto the X-Y plane. The second sub electrode 13 has a second superimposed portion 13p overlaying the first sub electrode 12 and a second non-superimposed portion 13q not overlaying the first sub electrode 12 when projected onto the X-Y plane.

An electrode pair 15 (a first electrode pair 15a) is formed of one first sub electrode 12 and one second sub electrode 13 that has a portion overlaying the one first sub electrode 12 when projected onto the X-Y plane.

The control unit 77 further controls the potential of the second sub electrode 13. For example, the control unit 77 applies the first voltage between the first opposing electrode 21 and the first electrodes 11 (the first major electrode 11a and the second major electrode 11b). The control unit 77 applies the second voltage between the first opposing electrode 21 and the first sub electrodes 12. The control unit 77 applies a third voltage between the first opposing electrode 21 and the second sub electrodes 13.

In the specification, the state in which the voltage is applied includes the state of being set to the same potential, i.e., the state in which a voltage of 0 volts is applied.

The first voltage and the second voltage are voltages that change the alignment of the liquid crystal of the liquid crystal layer 30. For example, the third voltage is a voltage that does not change the alignment or that creates a state in which the change of the alignment is small. Thereby, the voltage applied to the combination of the first sub electrode 12 and the second sub electrode 13 of the electrode pair 15 can be changed abruptly.

The alignment of the liquid crystal may be changed by the third voltage. Thereby, the controllability of the refractive index distribution 31 of the liquid crystal layer 30 further increases.

For example, the boundary between the lens center portion 35c and the first refractive index increase portion 36a is disposed at a position that overlays the electrode pair 15 when projected onto the X-Y plane.

In such a case as well, the light that includes the kth major region parallax image Pk of the first elemental image region 81 is emitted outside the liquid crystal optical apparatus 122 through the lens center portion 35c; and the light that includes the kth adjacent region parallax image Qk of the second elemental image region 82 is emitted outside the liquid crystal optical apparatus 122 through the first refractive index increase portion 36a. The occurrence of the reverse tilt can be suppressed; the stray light can be suppressed; and a high-quality display can be provided.

Figure 11:
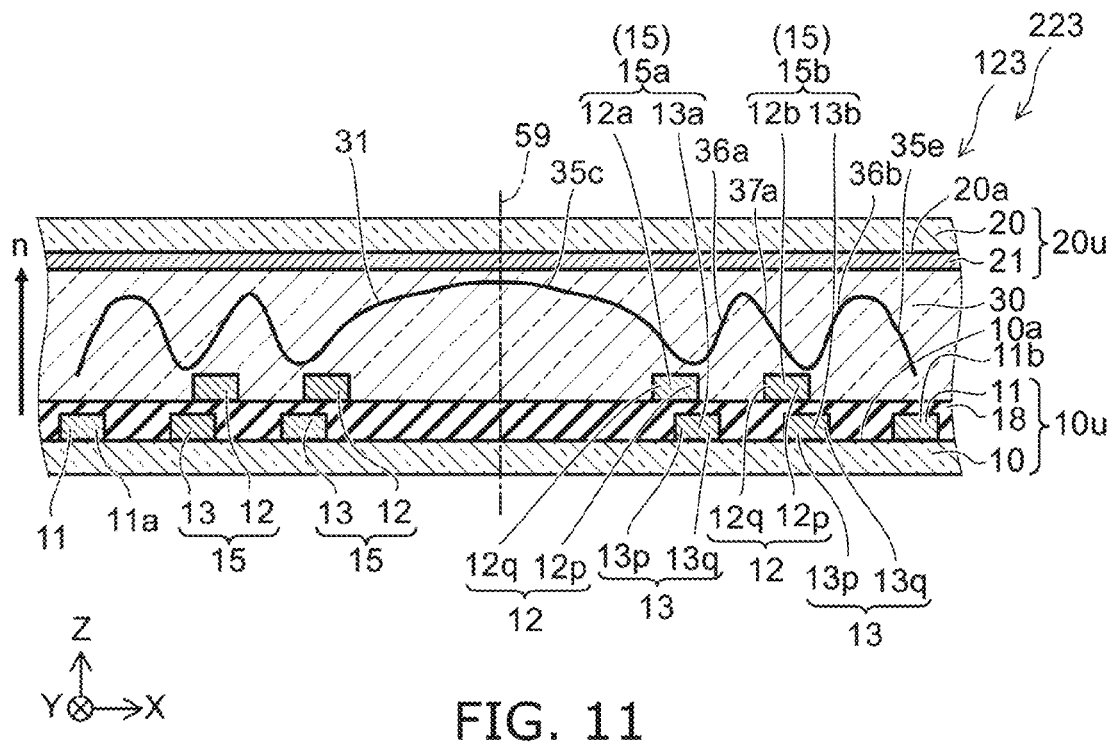
FIG. 11 is a schematic cross-sectional view illustrating the configuration of another image display device according to the second embodiment.

FIG. 11 is a schematic cross-sectional view illustrating the configuration of another image display device according to the second embodiment.

In FIG. 11 as well, a portion of the liquid crystal optical apparatus is illustrated, and the control unit 77 and the image display unit 80 are not illustrated.

In the image display device 223 and a liquid crystal optical apparatus 123 according to this embodiment as illustrated in FIG. 11, the first substrate unit 10u includes multiple electrode pairs 15 (the first electrode pair 15a, a second electrode pair 15b, etc.).

The second electrode pair 15b includes a first sub electrode 12b, a second sub electrode 13b, and the insulating layer 18.

The second electrode pair 15b includes the first sub electrode 12b of the second electrode pair 15b extending in the Y-axis direction, the second sub electrode 13b of the second electrode pair 15b extending in the Y-axis direction, and the insulating layer 18 provided between the first sub electrode 12b and the second sub electrode 13b.

The first sub electrode 12b of the second electrode pair 15b has the first superimposed portion 12p overlaying the second sub electrode 13b of the second electrode pair 15b and the first non-superimposed portion 12q not overlaying the second sub electrode 13b of the second electrode pair 15b when projected onto the X-Y plane. The second sub electrode 13b of the second electrode pair 15b has the second superimposed portion 13p overlaying the first sub electrode 12b of the second electrode pair 15b and the second non-superimposed portion 13q not overlaying the first sub electrode 12b of the second electrode pair 15b when projected onto the X-Y plane.

Optical characteristics having a Fresnel lens-like configuration including multiple subordinate lenses are obtained by the multiple electrode pairs 15.

In such a case as well, the light that includes the kth major region parallax image Pk of the first elemental image region 81 is emitted outside the liquid crystal optical apparatus 123 through the lens center portion 35c; and the light that includes the kth adjacent region parallax image Qk of the second elemental image region 82 is emitted outside the liquid crystal optical apparatus 123 through the first refractive index increase portion 36a. The occurrence of the reverse tilt can be suppressed; the stray light can be suppressed; and a high-quality display can be provided.

Figure 12:
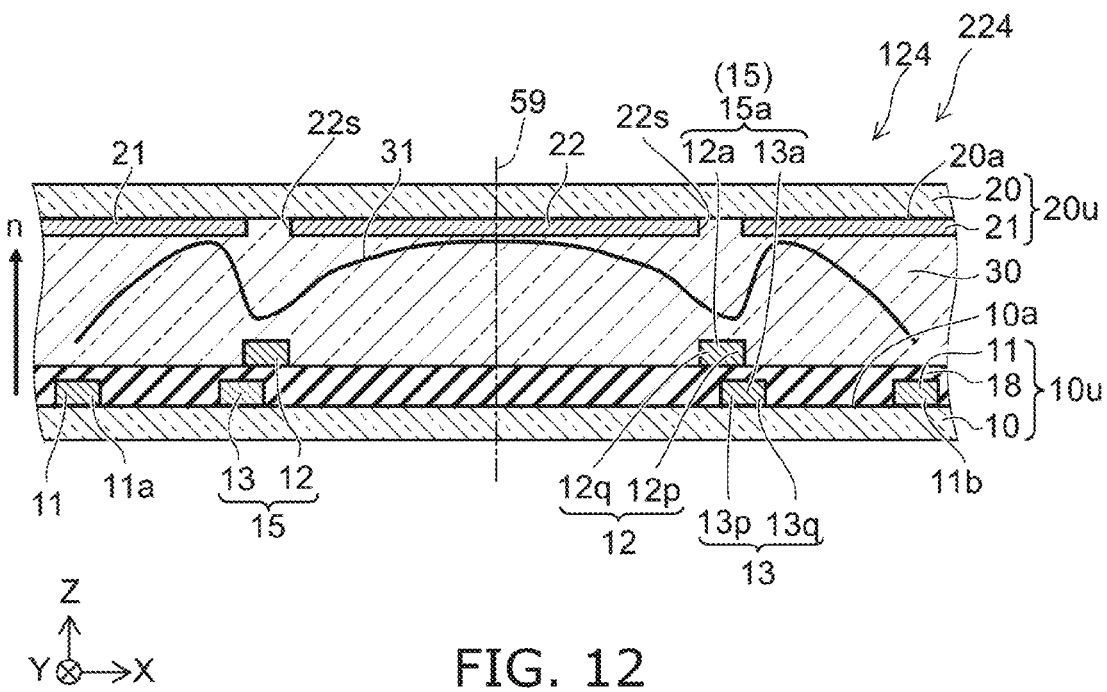
FIG. 12 is a schematic cross-sectional view illustrating the configuration of another image display device according to the second embodiment.

FIG. 12 is a schematic cross-sectional view illustrating the configuration of another image display device according to the second embodiment.

In FIG. 12 as well, a portion of the liquid crystal optical apparatus is illustrated, and the control unit 77 and the image display unit 80 are not illustrated.

In the image display device 224 and a liquid crystal optical apparatus 124 according to this embodiment as illustrated in FIG. 12, the configuration of the second substrate unit 20u is different from that of the liquid crystal optical apparatus 122.

In other words, the second substrate unit 20u includes the second opposing electrode 22 in addition to the second substrate 20 and the first opposing electrode 21. The second opposing electrode 22 is provided on the second major surface 20a of the second substrate 20. The second opposing electrode 22 is separated from the first opposing electrode 21 and extends in the Y-axis direction. The second opposing electrode 22 overlays the central axis 59 when projected onto the X-Y plane.

A first separating region 22s between the first opposing electrode 21 and the second opposing electrode 22 overlays at least a portion of the first electrode pair 15a when projected onto the X-Y plane.

In this example, the first opposing electrode 21 and the second opposing electrode 22 are provided in the second substrate unit 20u. Therefore, for example, the potential of the first opposing electrode 21 that opposes the second major electrode 11b can be set to a potential that is different from the potential of the second opposing electrode 22 that overlays the central axis 59 corresponding to the lens center. Thereby, the controllability of the refractive index distribution increases. Also, the refractive index distribution can be controlled with higher precision by disposing the first separating region 22s to oppose at least a portion of the first electrode pair 15a.

For example, the length (a width w22) of the first separating region 22s along the X-axis direction between the first opposing electrode 21 and the second opposing electrode 22 is not less than 5 μm and not more than 300 μm.

Figure 13:
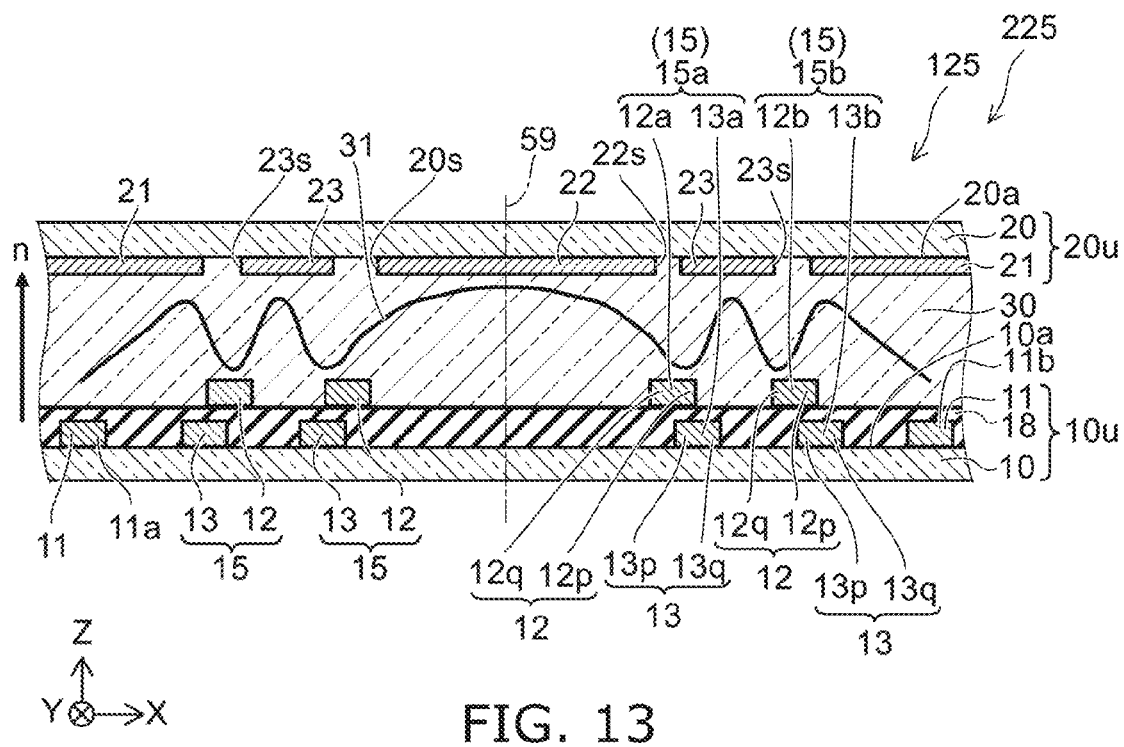
FIG. 13 is a schematic cross-sectional view illustrating the configuration of another image display device according to the second embodiment.

FIG. 13 is a schematic cross-sectional view illustrating the configuration of another image display device according to the second embodiment.

In FIG. 13 as well, a portion of the liquid crystal optical apparatus is illustrated, and the control unit 77 and the image display unit 80 are not illustrated.

In the image display device 225 and a liquid crystal optical apparatus 125 according to this embodiment as illustrated in FIG. 13, the first substrate unit 10u further includes the second electrode pair 15b. The second electrode pair 15b is provided on the first major surface 10a and between the first electrode pair 15a and the second major electrode 11b.

The second electrode pair 15b includes the first sub electrode 12b of the second electrode pair 15b extending in the Y-axis direction, the second sub electrode 13b of the second electrode pair 15b extending in the Y-axis direction, and the insulating layer 18 provided between the first sub electrode 12b and the second sub electrode 13b.

The second substrate unit 20u further includes a third opposing electrode 23. Otherwise, the liquid crystal optical apparatus 125 is similar to the liquid crystal optical apparatus 124, and a description is therefore omitted.

The third opposing electrode is provided on the second major surface 20a between the first opposing electrode 21 and the second opposing electrode 22. The third opposing electrode 23 is separated from the first opposing electrode 21 and the second opposing electrode 22; and a second separating region 23s is made. The third opposing electrode 23 extends in the Y-axis direction. The third opposing electrode 23 may include, for example, the same material as that of the first electrode 11, etc.

The refractive index distribution can be controlled with higher precision by disposing the second separating region 23s to oppose at least a portion of the second electrode pair 15b.

In the image display devices 224 and 225 as well, the light that includes the kth major region parallax image Pk of the first elemental image region 81 is emitted outside the liquid crystal optical apparatuses 124 and 125 through the lens center portion 35c; and the light that includes the kth adjacent region parallax image Qk of the second elemental image region 82 is emitted outside the liquid crystal optical apparatuses 124 and 125 through the first refractive index increase portion 36a. The occurrence of the reverse tilt can be suppressed; the stray light can be suppressed; and a high-quality display can be provided.

Third Embodiment

Figure 14:
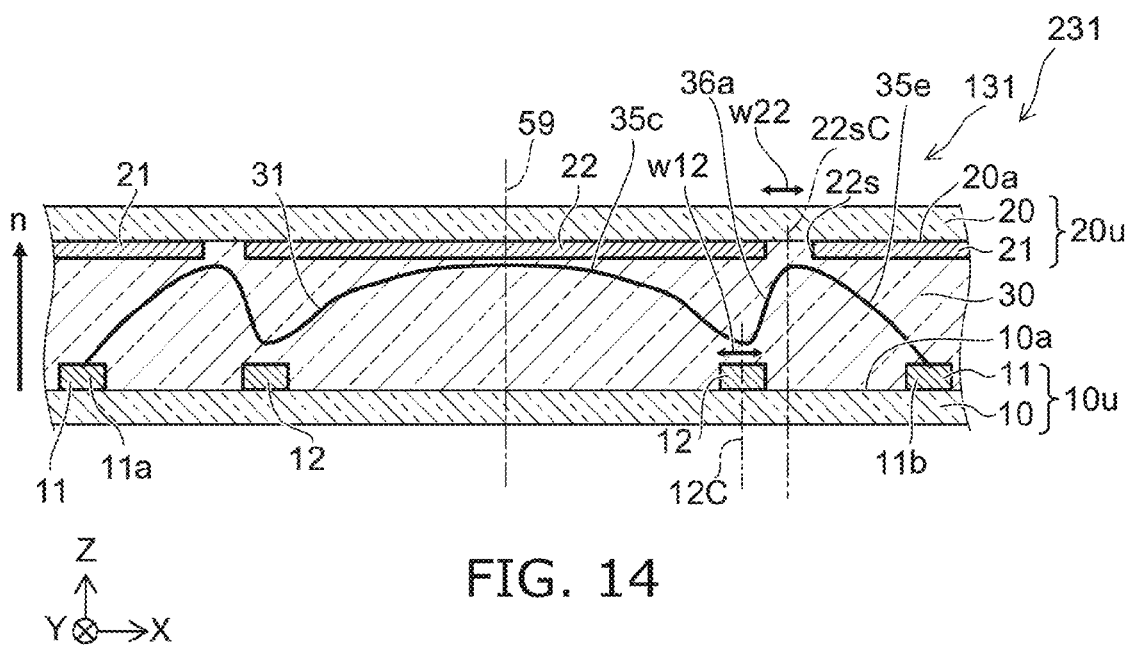
FIG. 14 is a schematic cross-sectional view illustrating the configuration of an image display device according to a third embodiment.

FIG. 14 is a schematic cross-sectional view illustrating the configuration of an image display device according to a third embodiment. In FIG. 14 as well, a portion of the liquid crystal optical apparatus is illustrated, and the control unit 77 and the image display unit 80 are not illustrated. The first lens region 71 is displayed for easier viewing of the drawing. The configuration of the second lens region 72 is similar to the configuration of the first lens region 71. The relationship between the first lens region 71 and the first elemental image region 81 and the relationship between the second lens region 72 and the second elemental image region 82 are similar to those of the first embodiment.

In the image display device 231 and a liquid crystal optical apparatus 131 according to this embodiment as illustrated in FIG. 14, the first substrate unit 10u includes the first substrate 10, the multiple first electrodes 11, and the multiple first sub electrodes 12. The configurations of the first substrate 10, the multiple first electrodes 11, and the multiple first sub electrodes 12 may be similar to the configurations described in regard to the first embodiment, and a description is omitted.

In this example, the second substrate unit 20u further includes the second opposing electrode 22 in addition to the second substrate 20 and the first opposing electrode 21. The configurations of the second substrate 20 and the first opposing electrode 21 may be similar to the configurations described in regard to the first embodiment, and a description is omitted.

The second opposing electrode 22 extends in the Y-axis direction while being separated from the first opposing electrode 21. The region (the gap) between the first opposing electrode 21 and the second opposing electrode 22 is the first separating region 22s. The second opposing electrode 22 overlays the central axis 59 when projected onto the X-Y plane. The first separating region 22s (the gap) extends along the Y-axis direction.

The distance along the X-axis direction between the central axis 59 and a center 22sC of the first separating region 22s along the X-axis direction when projected onto the X-Y plane is taken as a distance d22. The distance along the X-axis direction between the central axis 59 and a center 12C of the first sub electrode 12 along the X-axis direction when projected onto the X-Y plane is taken as a distance d12. In this embodiment, the distance d22 is longer than the distance d12.

The first separating region 22s of the electrodes provided in the second substrate unit 20u forms a pair with the first sub electrode 12 provided in the first substrate unit 10u. In one pair, the position of the first separating region 22s along the X-axis direction is shifted from the position of the first sub electrode 12 along the X-axis direction. In other words, an asymmetry is introduced to the disposition of the electrodes in the X-axis direction. Thereby, an asymmetry can be formed in the electric field distribution formed inside the liquid crystal layer 30; and it becomes easier to control the characteristics of the refractive index distribution 31 of the liquid crystal optical apparatus 131. Thereby, for example, it becomes easier to control the tilt (e.g., the tilt angle parameter γ) of the first refractive index increase portion 36a.

For example, the length (the width w22) of the first separating region 22s along the X-axis direction between the first opposing electrode 21 and the second opposing electrode 22 is not less than 5 μm and not more than 300 μm.

In such a case as well, the light that includes the kth major region parallax image Pk of the first elemental image region 81 is emitted outside the liquid crystal optical apparatus 131 through the lens center portion 35c; and the light that includes the kth adjacent region parallax image Qk of the second elemental image region 82 is emitted outside the liquid crystal optical apparatus 131 through the first refractive index increase portion 36a. The occurrence of the reverse tilt can be suppressed; the stray light can be suppressed; and a high-quality display can be provided.

According to the embodiments, a liquid crystal optical apparatus and an image display device that provide a high-quality display can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the invention is not limited to these specific examples. For example, one skilled in the art may similarly practice the invention by appropriately selecting specific configurations of components included in image display devices such as liquid crystal optical apparatuses, first substrate units, second substrate units, liquid crystal layers, first substrates, second substrates, first electrodes, first to third major electrodes, first to second sub electrodes, first to third opposing electrodes, insulating layers, control units, display units, display drive units, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all image display devices practicable by an appropriate design modification by one skilled in the art based on the image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image display device, comprising:
   a liquid crystal optical apparatus including
      a first substrate unit including
         a first substrate having a first major surface,
         a first major electrode provided on the first major surface to extend in a first direction,
         a second major electrode provided on the first major surface and separated from the first major electrode to extend in the first direction,
         a third major electrode provided on the first major surface to extend in the first direction, the second major electrode being disposed between the first major electrode and the third major electrode, and
         a first sub electrode provided on the first major surface between the first major electrode and the second major electrode and between the second major electrode and the third major electrode to extend in the first direction,
      a second substrate unit including
         a second substrate having a second major surface opposing the first major surface, and
         a first opposing electrode provided on the second major surface to oppose the first to third major electrodes, and
      a liquid crystal layer provided between the first substrate unit and the second substrate unit,
      the liquid crystal optical apparatus having a first lens region between the first major electrode and the second major electrode and a second lens region between the second major electrode and the third major electrode when projected onto a plane parallel to the first major surface;
   an image display unit including a display unit stacked with the liquid crystal optical apparatus, the display unit having a first elemental image region stacked with the first lens region and a second elemental image region stacked with the second lens region, the first elemental image region being configured to display first to Nth (N being an integer not less than 2) major region parallax images arranged in order in a second direction parallel to the plane and perpendicular to the first direction, the second elemental image region being configured to display first to Nth adjacent region parallax images arranged in order in the second direction; and
   a control unit configured to control a potential of the first to third major electrodes, a potential of the first sub electrode, and a potential of the first opposing electrode,
      the control unit being configured to reduce a refractive index of the liquid crystal layer along an outward direction from a central axis toward the second major electrode in a lens center portion overlaying the central axis, the central axis being parallel to the first direction to pass through a midpoint of a line segment connecting a center of the first major electrode to a center of the second major electrode when projected onto the plane,
      the control unit being configured to reduce the refractive index along the outward direction in a lens end portion, the lens end portion being more proximal to the second major electrode than is the lens center portion when projected onto the plane,
      the control unit being configured to increase the refractive index along the outward direction in a first refractive index increase portion provided between the lens center portion and the lens end portion,
      light including the kth (k being an integer not less than 1 and not more than N) major region parallax image of the first elemental image region being emitted outside the liquid crystal optical apparatus through the lens center portion,
      light including the kth adjacent region parallax image of the second elemental image region being emitted outside the liquid crystal optical apparatus through the first refractive index increase portion.

2. The device according to claim 1, wherein:
   k is not less than 2; and
   a ratio of a first luminance to a second luminance is not more than 0.2,
   the first luminance is a luminance of light including the (k−1)th adjacent region parallax image of the second elemental image region emitted outside the liquid crystal optical apparatus through the first refractive index increase portion, and
   the second luminance is a luminance of the light including the kth adjacent region parallax image of the second elemental image region emitted outside the liquid crystal optical apparatus through the first refractive index increase portion.

3. The device according to claim 1, wherein a distance along the second direction between the center of the first major electrode and the center of the second major electrode is equal to a distance along the second direction between the center of the second major electrode and a center of the third major electrode.

4. The device according to claim 1, wherein:
   the first sub electrode is disposed between the central axis and the second major electrode when projected onto the plane;
   the first substrate unit further includes
      a second sub electrode provided on the first major surface to extend in the first direction, and
      an insulating layer provided between the first sub electrode and the second sub electrode;
   the first sub electrode has a first superimposed portion overlaying the second sub electrode and a first non-superimposed portion not overlaying the second sub electrode when projected onto the plane, and the second sub electrode has a second superimposed portion overlaying the first sub electrode and a second non-superimposed portion not overlaying the first sub electrode when projected onto the plane; and the control unit is configured to further control a potential of the second sub electrode.

5. The device according to claim 4, wherein:
the first opposing electrode extends along the first direction,
the second substrate unit further includes an second opposing electrode provided on the second major surface, separated from the first opposing electrode and extending in the first direction,
a first separating region between the first opposing electrode and the second opposing electrode overlays at least a portion of a first electrode pair including the first sub electrode, the second sub electrode and the insulating layer when projected onto the plane, and
the control unit is configured to further control a potential of the second opposing electrode.

6. The device according to claim 1, wherein:
the first sub electrode is disposed between the central axis and the second major electrode when projected onto the plane,
the first substrate unit further includes a second sub electrode provided on the first major surface and disposed between the first sub electrode and the second major electrode,
the control unit is configured to further control a potential of the second sub electrode.

7. The device according to claim 6, wherein
the control unit is configured to increase the refractive index along the outward direction at a second refractive index increase portion provided between the first refractive index increase portion and the lens end portion, and
the control unit is configured to reduce the refractive index along the outward direction at a portion between the first refractive index increase portion and the second refractive index increase portion.

8. The device according to claim 1, wherein:
the first opposing electrode extends in the first direction;
the second substrate unit further includes a second opposing electrode provided on the second major surface and separated from the first opposing electrode to extend in the first direction; and
the control unit is configured to further control a potential of the second opposing electrode.

9. The device according to claim 8, wherein:
a distance along the second direction between the central axis and a center of a first separating region between the first opposing electrode and the second opposing electrode is longer than a distance along the second direction between a center of the first sub electrode and the central axis.

10. The device according to claim 1, wherein
the control unit is configured to increase the refractive index along the outward direction at a second refractive index increase portion provided between the first refractive index increase portion and the lens end portion, and
the control unit is configured to reduce the refractive index along the outward direction at a portion between the first refractive index increase portion and the second refractive index increase portion.

11. The device according to claim 1, wherein
the first major electrode, the second major electrode, the third major electrode, the first sub electrode, and the first opposing electrode include an oxide including at least one of element selected from the group consisting of In, Sn, Zn, and Ti, and a thickness of the first major electrode, a thickness of the second major electrode, a thickness of the third major electrode, a thickness of the first sub electrode, and a thickness of the first opposing electrode are not less than 100 nm and not more than 350 nm.

12. The device according to claim 1, wherein
the first major electrode, the second major electrode, the third major electrode, the first sub electrode, and the first opposing electrode include at least one selected from $In_2O_3$ and $SnO_3$.

13. The device according to claim 1, wherein
The liquid crystal layer includes a liquid crystal has a positive dielectric anisotropy, and
an initial alignment of the liquid crystal is a horizontal alignment.

14. The device according to claim 1, wherein
The liquid crystal layer includes a liquid crystal has a negative dielectric anisotropy, and
an initial alignment of the liquid crystal is a vertical alignment.

15. The device according to claim 1, wherein
an orientation direction in a portion of the liquid crystal layer proximal to the first substrate unit is antiparallel to an orientation direction in a portion of the liquid crystal layer proximal to the second substrate unit.

16. The device according to claim 1, wherein
an angle of a tilt in the first refractive index increase portion is 16±9 degrees when a direction perpendicular to the first direction and the second direction is taken as a reference.

17. The device according to claim 1, wherein
a position of a minimum value of a refractive index at the first refractive index increase portion is at a distance of 80% of ½ of a lens pitch from the central axis, the lens pitch being a distance along the second direction between the first major electrode and the second major electrode,
a thickness of the liquid crystal layer is not more than 1/10 of the lens pitch.

18. The device according to claim 1, wherein
a width along the second direction of the first refractive index increase portion is taken as δx (millimeter),
a change of a refractive index of the first refractive index increase portion is taken as δn,
a birefringence of the liquid crystal of the liquid crystal layer is taken as Δn,
a distance along the second direction between a center of the first major electrode and a center of the second major electrode is taken as Ip (millimeter), and
a normalized tilt α expressed by (δn/Δn)/(δx/Ip) is not less than 4.98 and not more than 19.1.

19. The device according to claim 1, wherein
a length of the first major electrode along the second direction is not less than 5 μm and not more than 300 μm, and
a length of the first sub electrode along the second direction is not less than 5 μm and not more than 300 μm.

20. The device according to claim 1, wherein
a distance between the second-direction center of the first major electrode and the second-direction center of the second major electrode is not less than 10 μm and not more than 1000 μm.

* * * * *